US008274926B2

(12) United States Patent
Shirakata et al.

(10) Patent No.: US 8,274,926 B2
(45) Date of Patent: Sep. 25, 2012

(54) CONTROL DEVICE, COMMUNICATION TERMINAL, CONTROL METHOD, AND COMMUNICATION METHOD

(75) Inventors: Naganori Shirakata, Osaka (JP); Hironori Nakae, Osaka (JP); Koji Imamura, Eindhoven (NL)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/677,730

(22) PCT Filed: Jul. 8, 2009

(86) PCT No.: PCT/JP2009/003185
§ 371 (c)(1),
(2), (4) Date: Mar. 11, 2010

(87) PCT Pub. No.: WO2010/007743
PCT Pub. Date: Jan. 21, 2010

(65) Prior Publication Data
US 2011/0261764 A1     Oct. 27, 2011

(30) Foreign Application Priority Data
Jul. 15, 2008  (JP) ................................ 2008-184260

(51) Int. Cl.
*H04B 7/212* (2006.01)
*H04W 4/00* (2009.01)
*G06F 15/173* (2006.01)

(52) U.S. Cl. ........ 370/321; 370/330; 370/338; 370/348; 455/509; 709/225

(58) Field of Classification Search .................. None
See application file for complete search history.

(56) References Cited

U.S. PATENT DOCUMENTS 7,046,650 B2 * 5/2006 Sherman ........................ 370/338
7,046,651 B2 * 5/2006 Terry ............................. 370/338
(Continued)

FOREIGN PATENT DOCUMENTS

JP       2005-210694     8/2005
(Continued)

OTHER PUBLICATIONS

International Search Report issued Oct. 20, 2009 in corresponding International Application No. PCT/JP2009/003185.

*Primary Examiner* — Andrew Chriss
(74) *Attorney, Agent, or Firm* — Wenderoth, Lind & Ponack, L.L.P.

(57) ABSTRACT

In a wireless communication system according to the present invention: a control device and a communication terminal communicate in an active period. The control device: generates a first beacon packet including one or more candidate channels; transmits the first beacon packet at the beginning of the active period; determines whether or not a use channel is to be changed based on a communication state, and generates a second beacon packet including information of a determination result; transmits the second beacon packet at the end of the active period; and, when it is determined that the use channel is to be changed, changes the use channel after the active period ends and before a next active period starts. The communication terminal: receives the first and second beacon packets; and, based on the second beacon packet, changes the use channel after the active period ends and before a next active period starts.

19 Claims, 19 Drawing Sheets

U.S. PATENT DOCUMENTS

| | | | |
|---|---|---|---|
| 8,155,139 B2 * | 4/2012 | Wentink et al. | 370/445 |
| 8,170,546 B2 * | 5/2012 | Bennett | 455/424 |
| 2002/0089927 A1 * | 7/2002 | Fischer et al. | 370/229 |
| 2003/0002456 A1 * | 1/2003 | Soomro et al. | 370/328 |
| 2004/0043767 A1 * | 3/2004 | Tsutsumi et al. | 455/432.1 |
| 2004/0125775 A1 * | 7/2004 | Rios | 370/338 |
| 2004/0152416 A1 * | 8/2004 | Dahl | 455/41.2 |
| 2004/0170217 A1 * | 9/2004 | Ho | 375/134 |
| 2005/0036469 A1 * | 2/2005 | Wentink | 370/338 |
| 2005/0047383 A1 * | 3/2005 | Yoshida | 370/338 |
| 2005/0227615 A1 | 10/2005 | Sakoda | |
| 2005/0238016 A1 * | 10/2005 | Nishibayashi et al. | 370/389 |
| 2006/0114878 A1 * | 6/2006 | Choe et al. | 370/346 |
| 2007/0110097 A1 * | 5/2007 | Hsieh | 370/464 |
| 2007/0207765 A1 | 9/2007 | Nakahara et al. | |
| 2007/0230423 A1 * | 10/2007 | Yoshida et al. | 370/338 |
| 2008/0253328 A1 | 10/2008 | Sahinoglu et al. | |

FOREIGN PATENT DOCUMENTS

| | | |
|---|---|---|
| JP | 2006-93787 | 4/2006 |
| JP | 2007-143095 | 6/2007 |

* cited by examiner

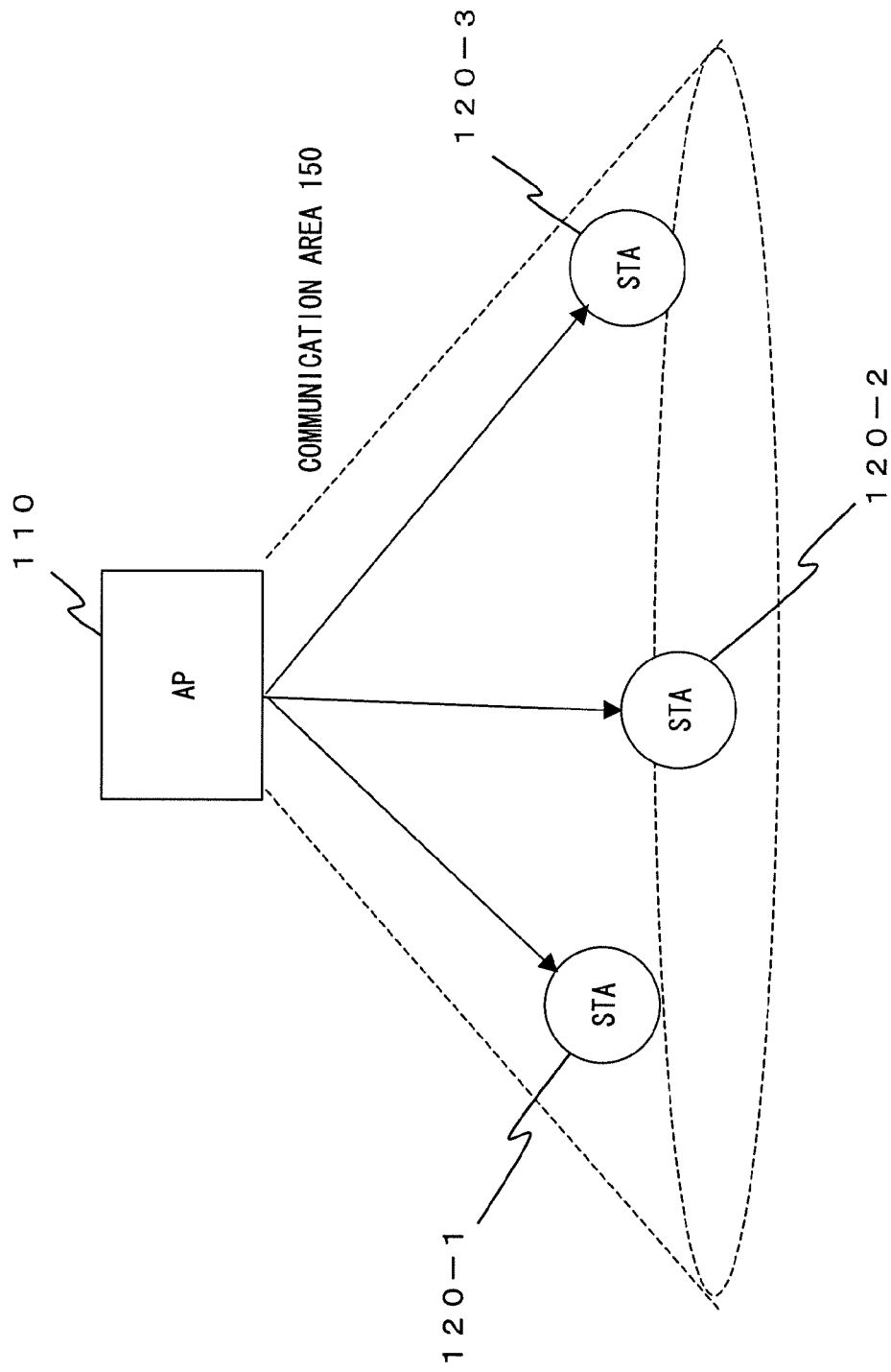

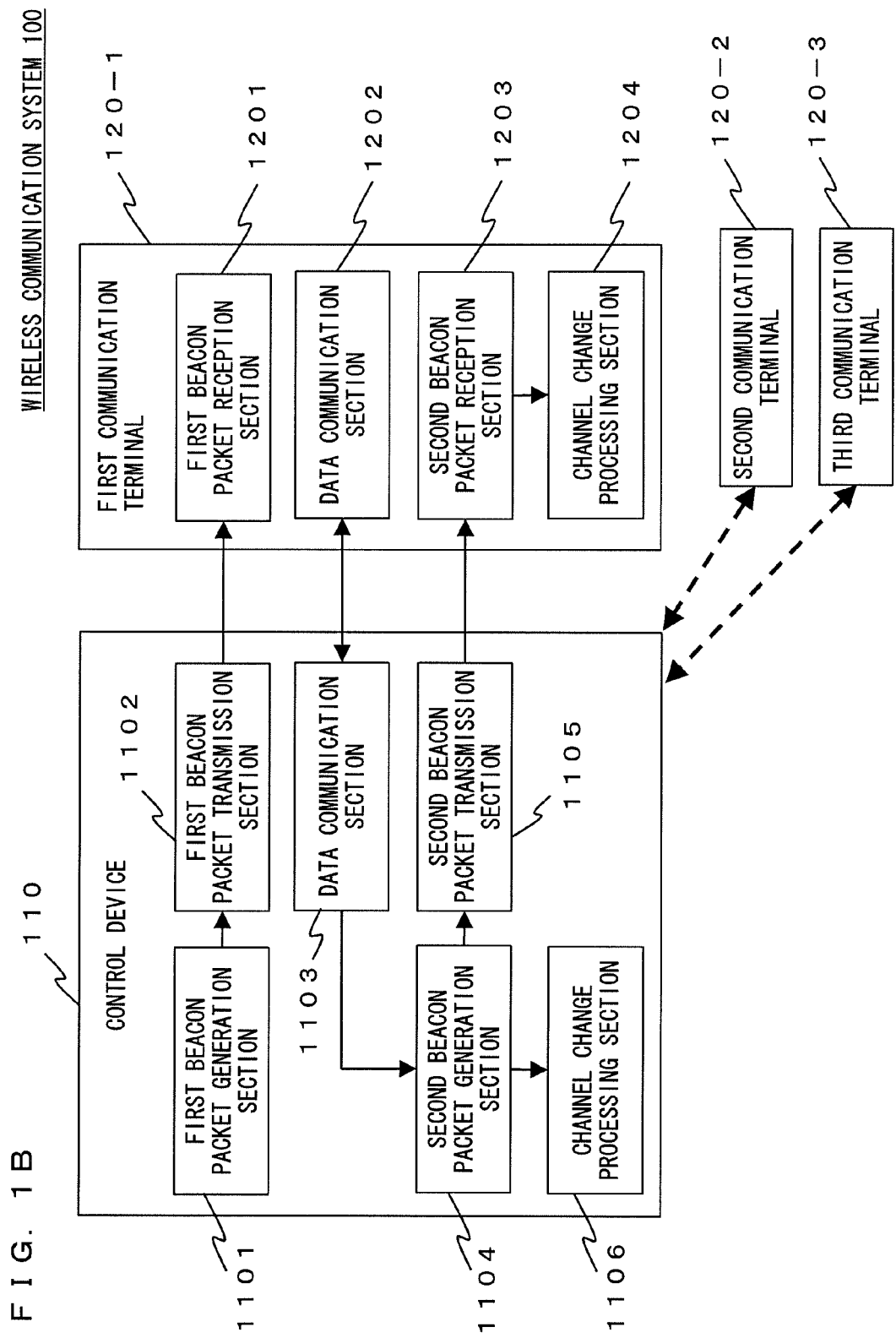

F I G. 2
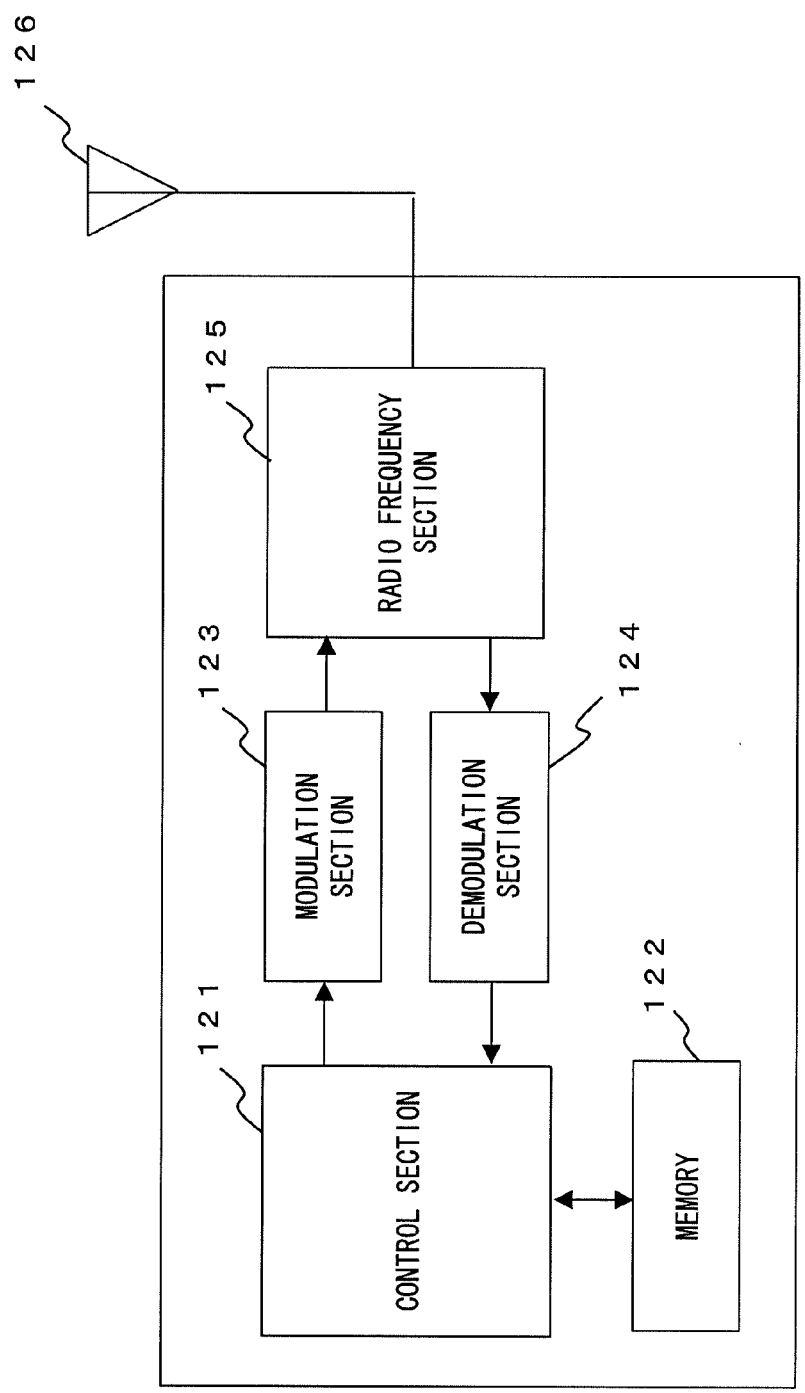

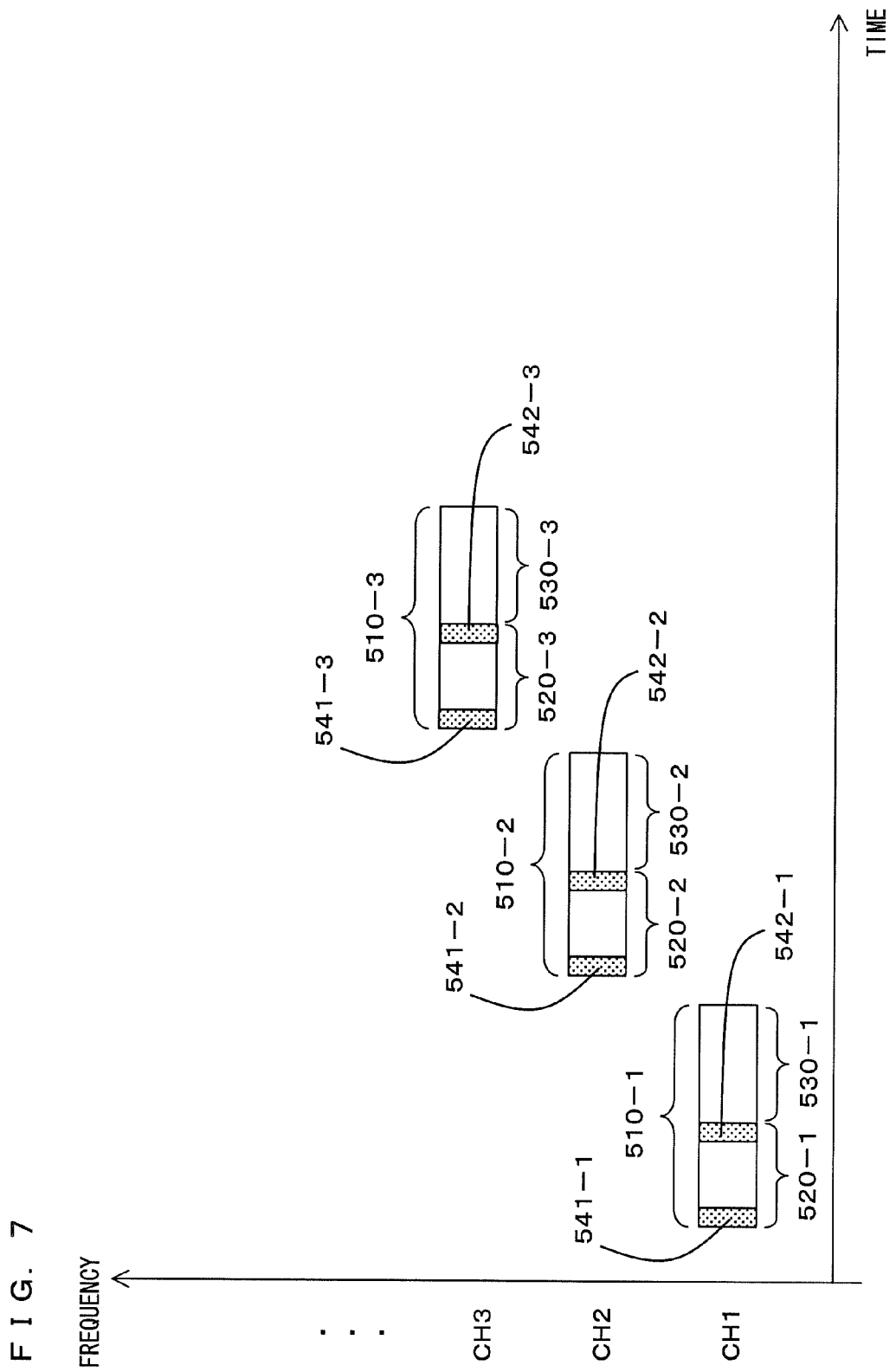

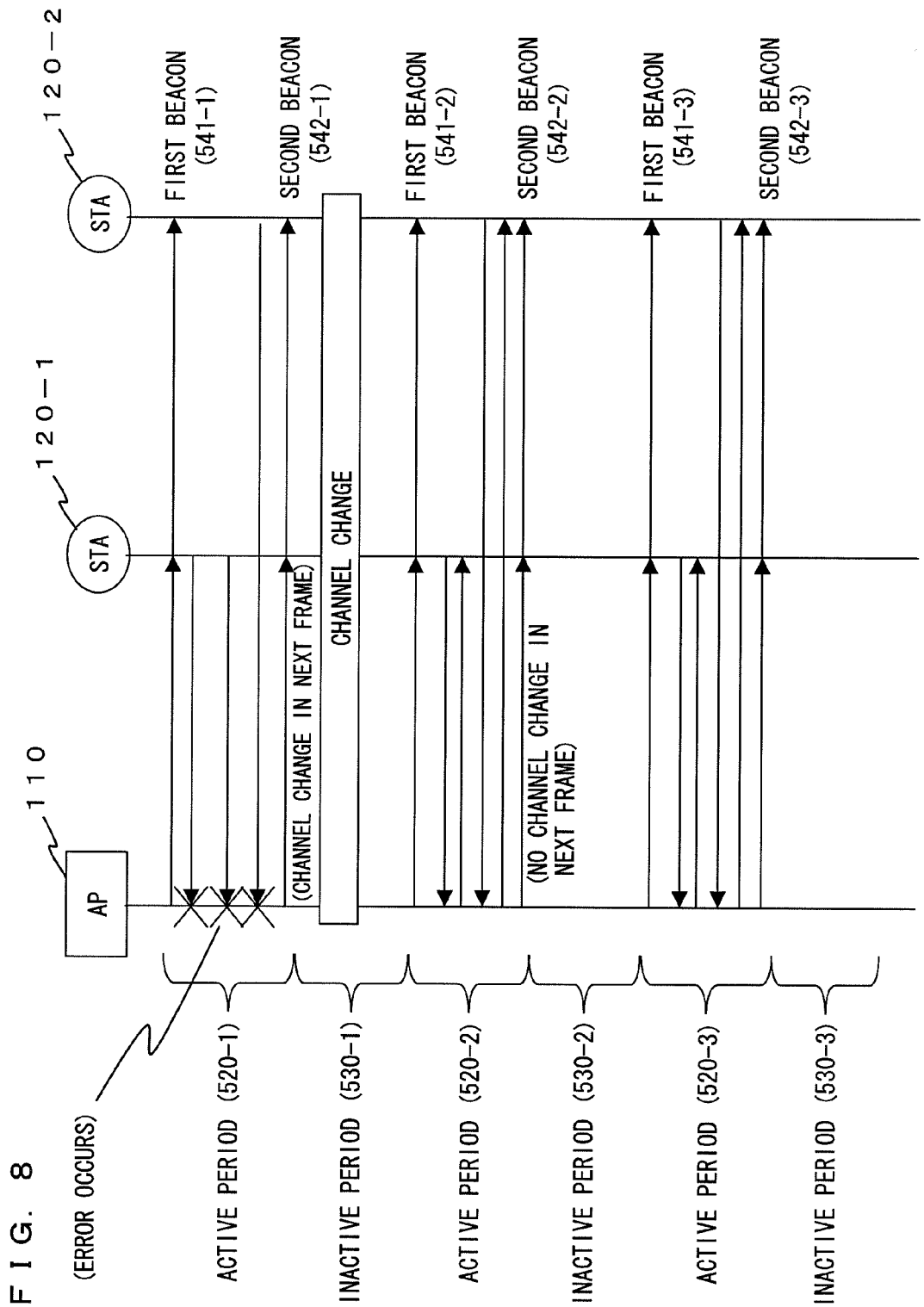

CONTROL DEVICE, COMMUNICATION TERMINAL, CONTROL METHOD, AND COMMUNICATION METHOD

TECHNICAL FIELD

The present invention relates to a control device, a communication terminal, a control method, and a communication method, which are used for a wireless communication system, and more particularly relates to a control device, a communication terminal, a control method, and a communication method, which avoid interference caused by a plurality of channels being used in a sensor network or a wireless communication network using an active RF (Radio Frequency) tag.

BACKGROUND ART

In recent years, there has been an increasing interest in a network that uses a small-size, low-power-consumption wireless terminal, such as a WPAN (Wireless Personal Area Network) and a sensor network. Also, as a system similar to the network, an active RF tag system that transmits a wireless signal by itself, can be mentioned.

FIG. 13 shows a conventional wireless communication system 10. In FIG. 13, the wireless communication system 10 includes a control device (AP: Access Point) 11, and first to third communication terminals (STA: Station) 12-1 to 12-3. The first to third communication terminals 12-1 to 12-3 exist within a communication area 15 of the control device 11. The control device 11 periodically broadcasts a beacon packet to the first to third communication terminals 12-1 to 12-3 which are all the communication terminals existing within the communication area 15. The beacon packet includes control information. The first to third communication terminals 12-1 to 12-3 receive the beacon packet from the control device 11, and communicate with the control device 11 based on the control information included in the beacon packet.

Here, in the wireless communication system 10, various methods can be adopted as an access method for access between the control device 11 and each of the communication terminals 12-1 to 12-3. For example, CSMA (Carrier Sense Multiple Access), TDMA (Time Division Multiple Access), FDMA (Frequency Division Multiple Access), SDMA (Space Division Multiple Access), and the like, can be mentioned as the access method.

In a network of the wireless communication system 10, a transmission speed is low (several kbps to several hundred kbps), and a distance traveled by a wireless signal is short (approximately several meters to several tens of meters). On the other hand, each of the communication terminals 12-1 to 12-3 is characterized by having a small size and low power consumption that allows the communication terminal to be driven by a battery for several years. Accordingly, in order to reduce power consumption of each of the communication terminals 12-1 to 12-3, a communication protocol and a frame format are devised. For example, a frame format including an active period in which each of the communication terminals 12-1 to 12-3 performs communication and an inactive period in which each of the communication terminals 12-1 to 12-3 does not perform communication is used. In the inactive period, each of the communication terminals 12-1 to 12-3 does not perform communication and therefore can be in a sleep mode. That is, by setting the inactive period long, a time period in which each of the communication terminals 12-1 to 12-3 is in the sleep mode becomes long, and thus the power consumption can be reduced.

FIG. 14 shows a conventional frame format 50. In FIG. 14, a frame 51 which is described in a frame format 50 includes an active period 52 and an inactive period 53.

The active period 52 is a period in which each of the communication terminals 12-1 to 12-3 performs communication, and has a plurality of time slots. The plurality of time slots of the active period 52 are shared among all the communication terminals existing within the network of the wireless communication system 10.

Among the plurality of time slots of the active period 52, the first time slot is allocated as a period for transmitting and receiving a beacon packet 54. In the first time slot, the control device 11 broadcasts the beacon packet 54 to the first to third communication terminals 12-1 to 12-3 which are all the communication terminals existing within the communication area 15. The beacon packet 54 includes control information concerning the frame 51, such as the number of time slots of the active period 52, allocation of the time slots, the length of the active period 52, the length of the inactive period 53, and a time until transmission of the next beacon packet.

Among the plurality of time slots of the active period 52, the time slots other than the first time slot are used for communication between the control device 11 and each of the communication terminals 12-1 to 12-3.

On the other hand, the inactive period 53 is a period in which each of the communication terminals 12-1 to 12-3 does not perform communication. In the inactive period 53, each of the communication terminals 12-1 to 12-3 is in a sleep mode, and thereby the power consumption is reduced.

FIG. 15 shows a communication sequence between the control device 11 and each of the communication terminals 12-1 to 12-3 in the wireless communication system 10. Here, for convenience of the description, the third communication terminal 12-3 is omitted.

In the first time slot of an active period 52-1, the control device 11 broadcasts a beacon packet 54-1 to each of the communication terminals 12-1 and 12-2. Each of the communication terminals 12-1 and 12-2 receives the beacon packet 54-1 from the control device 11, and acquires control information included in the beacon packet 54-1.

Subsequently, in the active period 52-1, the control device 11 and each of the communication terminals 12-1 and 12-2 communicate with each other. For example, each of the communication terminals 12-1 and 12-2 transmits data to the control device 11, and, in response thereto, the control device 11 transmits response data to each of the communication terminals 12-1 and 12-2.

In an inactive period 53-1, the control device 11 and each of the communication terminals 12-1 and 12-2 do not communicate with each other. In the inactive period 53-1, the control device 11 and each of the communication terminals 12-1 and 12-2 enter the sleep mode, and thereby power consumption can be reduced. Here, the length of the inactive period 53-1 is preliminarily notified by the control information included in the beacon packet 54-1.

When the inactive period 53-1 ends and a next active period 52-2 starts, the control device 11 and each of the communication terminals 12-1 and 12-2 recover from the sleep mode to an operation mode, and prepare for communication of a next frame.

In the active period 52-2, in the first time slot, the control device 11 broadcasts the beacon packet 54-2 to each of the communication terminals 12-1 and 12-2. Then, by repeating the same process described above, the control device 11 and each of the communication terminals 12-1 and 12-2 communicate with each other.

As shown in FIG. 15, in the active period 52-2, communication from the first communication terminal 12-1 to the control device 11 fails. Although data is transmitted from the first communication terminal 12-1 to the control device 11, the control device 11 cannot properly receive the data transmitted from the first communication terminal 12-1. In this case, the control device 11 cannot transmit response data to the first communication terminal 12-1. Since no response data is transmitted from the control device 11 even when a predetermined time period elapses, the first communication terminal 12-1 determines that the communication fails. Then, the first communication terminal 12-1 re-transmits data to the control device 11. Here, it is assumed that the control device 11 can properly receive the data re-transmitted from the first communication terminal 12-1. In this case, in response to the re-transmitted data, the control device 11 transmits response data to the first communication terminal 12-1, and the communication successfully completes.

FIG. 16 shows a channel band of a wireless channel. FIG. 16 shows a spectrum mask for channels CH1 to CH6, with the horizontal axis indicating a frequency. First to sixth channel bands 91 to 96 are channel bands of the channels CH1 to CH6, respectively.

The control device 11 selects a channel to be used for communication, from the channels CH1 to CH6, and broadcasts a beacon packet to the first to third communication terminals 12-1 to 12-3 which are all the communication terminals existing within the communication area 15. Each of the communication terminals 12-1 to 12-3 performs channel scanning, and participates in a network of a channel through which a beacon packet is received. In this manner, communication between the control device 11 and each of the communication terminals 12-1 to 12-3, which exist in the communication area 15 managed by the control device 11, starts.

A frequency band used by the network of the wireless communication system 10 described above is often shared with another network system. This causes a problem of interference between systems or between networks.

For example, at the 950 MHz band, a passive RF tag and an active RF tag partly use the same channel. At the 2.4 GHz band, more network systems such as a wireless LAN share a frequency band. Moreover, in a case where a system having large transmission power is used in an adjacent frequency band, for example, in a case where a mobile phone or the like is used, a wireless terminal which uses a simple, small-size radio frequency component such as an active RF tag cannot obtain channel selectivity and thus may suffer from interference.

In a frequency band in which interference from another network system is large, it is necessary to select a channel from a plurality of channels so as to avoid the interference from the another network system and to change a channel used by the communication terminal within the network.

FIG. 17 shows a situation in which the first communication terminal 12-1 changes a use channel by using the frame 51 which is described in the frame format 50 shown in FIG. 14. In FIG. 17, communication of a frame 51-1 is performed using a channel CH1. Here, it is assumed that, in the active period 52-1, the channel CH1 is largely influenced by interference from another network system. The control device 11 determines that communication with the first communication terminal 12-1 cannot be normally performed with the channel CH1, and transmits information for changing a use channel from the channel CH1 to a channel CH2 by using a beacon packet 54-2.

In the active period 52-2, the first communication terminal 12-1 receives the beacon packet 54-2 including information for changing the use channel from the channel CH1 to the channel CH2. However, in the active period 52-2, the control device 11 and the first communication terminal 12-1 communicate with each other by using the channel CH1, and after the active period 52-2 ends, in an inactive period 53-2, the use channel is changed to the channel CH2.

Then, for a next frame 51-3, the control device 11 and the first communication terminal 12-1 communicate with each other by using the channel CH2. When it is determined in the active period 52-3 that the channel CH2 is largely influenced by interference from another network system, the use channel is further changed from the channel CH2 to a channel CH3.

In this manner, in a frequency band that suffers from large interference from another network system, the control device 11 selects a channel to be used for communication from the channels CH1 to CH6 so as to avoid the interference from the another network system, and causes each communication terminal within the network to change a use channel.

Patent Literature 1 discloses a method of avoiding interference by performing communication using the channel CH2 in an inactive period, in a case where it is determined in an active period that the channel CH1 is largely influenced by interference from another network system.

CITATION LIST

Patent Literature
    Patent Literature 1: Japanese Laid-Open Patent Publication No. 2007-143095

SUMMARY OF INVENTION

Technical Problem

However, each communication terminal receives a beacon packet from a control device, only in a first time slot of an active period. Therefore, even if the communication terminal acquires information concerning a channel change, which is included in the received beacon packet, the communication terminal actually performs communication using the changed channel, from an active period of a next frame. That is, the control device and each communication terminal spend a long time before a channel is changed for avoiding interference from another network system and the control device and each communication terminal can actually communicate with each other by using the changed channel.

In a system that sets the inactive period long in order to reduce power consumption of each communication terminal, a time until a next active period is long, and therefore a longer time is spent before communication can be actually performed by using the changed channel.

A situation in which each communication terminal within the network changes the use channel in a case where influence of interference from another network system is large, will be specifically described.

FIG. 18 shows a communication sequence between the control device 11 and each of the communication terminals 12-1 to 12-3 in the wireless communication system 10. Here, for convenience of the description, the third communication terminal 12-3 is omitted.

In the first time slot of the active period 52-1, the control device 11 broadcasts the beacon packet 54-1 to each of the communication terminals 12-1 and 12-2. Each of the communication terminals 12-1 and 12-2 receives the beacon packet 54-1 from the control device 11, and acquires control information included in the beacon packet 54-1.

Subsequently, in the active period 52-1, the control device 11 and each of the communication terminals 12-1 and 12-2 communicate with each other. Here, a currently used channel is largely influenced by interference from another network system, and thus, in the active period 52-1, communication from each of the communication terminals 12-1 and 12-2 to the control device 11 fails. In this case, the control device 11 determines that communication with each of the communication terminals 12-1 and 12-2 cannot be normally performed with the currently used channel.

However, information for changing a use channel from a currently used channel to another channel cannot be notified in an inactive period in which each of the communication terminals 12-1 and 12-2 is in the sleep mode. Accordingly, the control device 11 notifies the information to each of the communication terminals 12-1 and 12-2, in the next active period 52-2.

In the inactive period 53-1, the control device 11 and each of the communication terminals 12-1 and 12-2 do not communicate with each other. In the inactive period 53-1, the control device 11 and each of the communication terminals 12-1 and 12-2 enter the sleep mode, and thereby power consumption can be reduced. Here, the length of the inactive period 53-1 is preliminarily notified by the control information included in the beacon packet 54-1.

When the inactive period 53-1 ends and the next active period 52-2 starts, the control device 11 and each of the communication terminals 12-1 and 12-2 recover from the sleep mode to the operation mode, and prepare for communication of a next frame.

In the active period 52-2, in the first time slot, the control device 11 broadcasts the beacon packet 54-2 to each of the communication terminals 12-1 and 12-2. Here, the beacon packet 54-2 includes information for changing a use channel, but in the active period 52-2, each of the communication terminals 12-1 and 12-2 performs communication by using the channel that has been used in the immediately preceding active period 52-1. Therefore, there is still large influence of interference from another network system, and communication from each of the communication terminals 12-1 and 12-2 to the control device 11 fails.

After the active period 52-2 ends, in the inactive period 53-2, the control device 11 and each of the communication terminals 12-1 and 12-2 perform a channel change process for changing the use channel to the channel notified in the beacon packet 54-2, and then enter the sleep mode.

After the inactive period 53-2 ends, in the first time slot of an active period 52-3, the control device 11 broadcasts a beacon packet 54-3 to each of the communication terminals 12-1 and 12-2, by using the changed channel.

Then, in the active period 52-3, the control device 11 and each of the communication terminals 12-1 and 12-2 communicate with each other by using the changed channel, and thereby avoid interference from another network system.

In this manner, when the information for changing the use channel is notified by using the beacon packet in the first time slot of the active period, a long time is spent before a channel change is completed. Therefore, when communication is actually performed by using the changed channel, circumstances within the network may already be changed.

Even though it is determined in the active period 52-1 that the currently used channel is largely influenced by interference from another network system, the same channel is used in the active period 52-2. Moreover, if, in the active period 52-2, each of the communication terminals 12-1 and 12-2 repeatedly performs re-transmission for the failure in the active period 52-1, congestion further increases. Additionally, in a case where a communication terminal (not shown), which has not participated in the network of the communication area 15 of the control device 11 in the active period 52-1, newly participates in the network in the active period 52-2, a possibility that communication packets collide with each other increases, and the congestion further increases.

Furthermore, a beacon packet including the information for changing the use channel may be transmitted in the inactive period, so that a change of the use channel is completed before the next active period starts. However, each communication terminal cannot enter the sleep mode because the communication terminal performs communication in the inactive period. Thus, power consumption cannot be reduced.

Therefore, an object of the present invention is to unfailingly realize communication between a control device and a communication terminal by using a channel that is changed in a manner that: the control device selects a channel from a plurality of channels so as to avoid interference from another network system, when the control device determines that there is large influence of interference from another network system in communication with the communication terminal; and the control device causes the communication terminal within a network to change a use channel in a short time.

Solution to Problem

To achieve the above object, a control device according to the present invention is a control device which manages a communication terminal within a communication area and communicates with the communication terminal in an active period by using a plurality of predetermined frequency channels, the control device comprising: a first beacon packet generation section that generates a first beacon packet which includes information indicating the active period and one or more candidate channels to which a use channel is possibly changed from a currently used channel; a first beacon packet transmission section that transmits the first beacon packet to the communication terminal, at the beginning of the active period; a second beacon packet generation section that: determines whether or not the use channel is to be changed, based on a state of communication with the communication terminal in the active period indicated by the transmitted first beacon packet; and generates a second beacon packet which includes information of whether or not the use channel is to be changed; a second beacon packet transmission section that transmits the second beacon packet to the communication terminal, at the end of the active period; and a channel change processing section that: when the second beacon packet generation section determines that the use channel is to be changed, changes the use channel to a change channel different from the currently used channel, after the active period ends and before a next active period starts; and, when the second beacon packet generation section determines that the use channel is not to be changed, maintains the currently used channel as the use channel.

It is preferred that, when the second beacon packet generation section determines that the use channel is to be changed, the second beacon packet includes the change channel, and, when the second beacon packet generation section determines that the use channel is not to be changed, the second beacon packet includes one or more candidate channels to which the use channel is possibly changed from the currently used channel.

Furthermore, it is preferred that the change channel is any of the one or more candidate channels included in the first beacon packet, or the change channel is a channel different from the one or more candidate channels included in the first beacon packet.

Furthermore, it is preferred that the first beacon packet includes a plurality of candidate channels of which a priority order is defined.

Furthermore, it is preferred that, when the number of communication errors occurring in communication with the communication terminal in the active period exceeds a predetermined threshold value, it is determined that the use channel is to be changed.

To achieve the above object, a communication terminal according to the present invention is a communication terminal which is managed by a control device of a communication area to which the communication terminal belongs, and communicates with the control device in an active period by using any of a plurality of predetermined frequency channels, the communication terminal comprising: a first beacon packet reception section that receives, from the control device, a first beacon packet which includes information indicating the active period and one or more candidate channels to which a use channel is possibly changed from a currently used channel, at the beginning of the active period; a second beacon packet reception section that receives, from the control device, a second beacon packet which includes information of whether or not the use channel is to be changed, at the end of the active period; and a channel change processing section that, based on the information of whether or not the use channel is to be changed which is included in the second beacon packet, when the use channel is to be changed, changes the use channel to a change channel different from the currently used channel after the active period ends and before a next active period starts, and, when the use channel is not to be changed, maintains the currently used channel as the use channel.

It is preferred that, when the use channel is to be changed, the second beacon packet includes the change channel, and, when the use channel is not to be changed, the second beacon packet includes one or more candidate channels to which the use channel is possibly changed from the currently used channel.

Furthermore, it is preferred that the change channel is any of the one or more candidate channels included in the first beacon packet, or the change channel is a channel different from the one or more candidate channels included in the first beacon packet.

Furthermore, it is preferred that the first beacon packet includes a plurality of candidate channels of which a priority order is defined.

Additionally, it is preferred that, when the first beacon packet reception section fails to receive the first beacon packet, the channel change processing section changes the use channel to a change channel different from the currently used channel.

Furthermore, it is preferred that the change channel is the one or more candidate channels included in the first beacon packet or the second beacon packet which has been previously successfully received.

Moreover, it is preferred that, when the second beacon packet reception section fails to receive the second beacon packet, the channel change processing section changes the use channel to a change channel different from the currently used channel.

Furthermore, it is preferred that the change channel is the one or more candidate channels included in the first beacon packet or the second beacon packet which has been previously successfully received.

Furthermore, to achieve the above object, a wireless communication system according to the present invention includes the control device and the communication terminal described above.

To achieve the above object, a control method according to the present invention is a control method performed by a control device which manages a communication terminal within a communication area and communicates with the communication terminal in an active period by using a plurality of predetermined frequency channels, the control method comprising: a first beacon packet generation step of generating a first beacon packet which includes information indicating the active period and one or more candidate channels to which a use channel is possibly changed from a currently used channel; a first beacon packet transmission step of transmitting the first beacon packet to the communication terminal at the beginning of the active period; a second beacon packet generation step of: determining whether or not the use channel is to be changed, based on a state of communication with the communication terminal in the active period indicated by the transmitted first beacon packet; and generating a second beacon packet which includes information of whether or not the use channel is to be changed; a second beacon packet transmission step of transmitting the second beacon packet to the communication terminal at the end of the active period; and a channel change processing step of: when it is determined in the second beacon packet generation step that the use channel is to be changed, changing the use channel to a change channel different from the currently used channel, after the active period ends and before a next active period starts; and, when it is determined in the second beacon packet generation step that the use channel is not to be changed, maintaining the currently used channel as the use channel.

To achieve the above object, a communication method according to the present invention is a communication method performed by a communication terminal which is managed by a control device of a communication area to which the communication terminal belongs, and communicates with the control device in an active period by using any of a plurality of predetermined frequency channels, the communication method comprising: a first beacon packet reception step of receiving, from the control device, a first beacon packet which includes information indicating the active period and one or more candidate channels to which a use channel is possibly changed from a currently used channel, at the beginning of the active period; a second beacon packet reception step of receiving, from the control device, a second beacon packet which includes information of whether or not the use channel is to be changed, at the end of the active period; and a channel change processing step of, based on the information of whether or not the use channel is to be changed which is included in the second beacon packet, when the use channel is to be changed, changes the use channel to a change channel different from the currently used channel after the active period ends and before a next active period starts, and, when the use channel is not to be changed, maintains the currently used channel as the use channel.

A sequence of steps of the control method and the communication method described above which are performed by the control device and the communication terminal, respectively, may be provided in the form of a program for causing a computer to perform the process steps. The program may be recorded on a computer-readable storage medium and, in such a mode, introduced into the computer.

Advantageous Effects of Invention

As described above, according to the present invention, when the control device determines that influence of interference from another network system is large in communication with the communication terminal, the control device selects a channel from a plurality of channels so as to avoid the interference from the another network system, and causes the communication terminal within the network to change the use channel in a short time. Thereby, communication between the control device and the communication terminal can be unfailingly realized by using the changed channel.

BRIEF DESCRIPTION OF DRAWINGS

FIG. 1A shows a wireless communication system 100 according to a first embodiment of the present invention.

FIG. 1B shows a control device 110 and communication terminals 120-1 to 120-3, which form the wireless communication system 100 according to the first embodiment of the present invention.

FIG. 2 shows the communication terminals 120-1 to 120-3.

FIG. 7 shows a situation in which the first communication terminal 120-1 changes a use channel by using a frame 510 which is described in the frame format 500 shown in FIG. 5.

FIG. 8 shows a communication sequence between the control device 110 and each of the communication terminals 120-1 to 120-3 in the wireless communication system 100.

DESCRIPTION OF EMBODIMENTS

Hereinafter, embodiments of the present invention will be described with reference to the drawings.

First Embodiment

Figure 13:
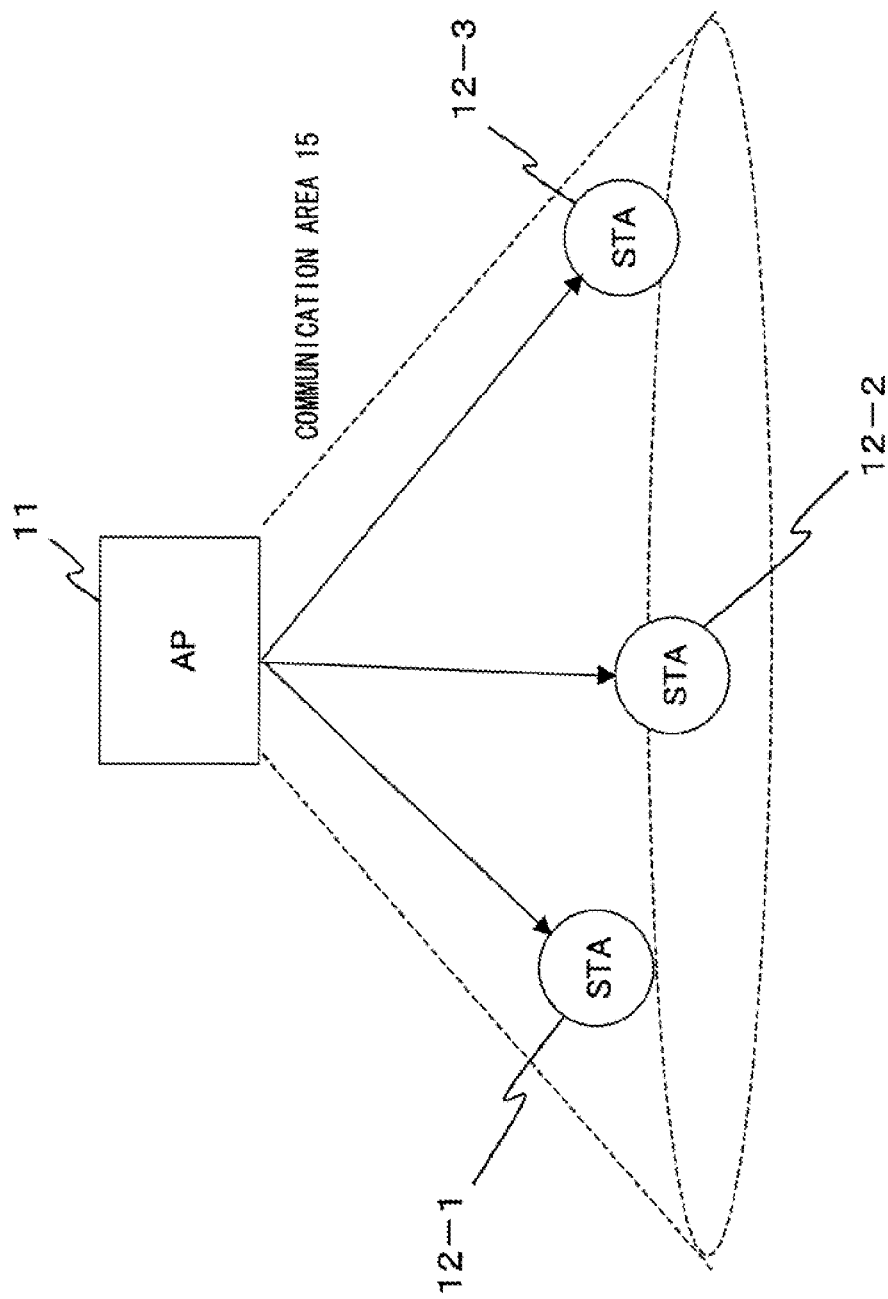
FIG. 13 shows a conventional wireless communication system 10.

FIG. 1A shows a wireless communication system 100 according to a first embodiment of the present invention. In FIG. 1A, the wireless communication system 100 includes a control device (AP: Access Point) 110 and first to third communication terminals (STA: Station) 120-1 to 120-3. The first to third communication terminals 120-1 to 120-3 exist within a communication area 150 of the control device 110. The control device 110 periodically broadcasts a beacon packet to the first to third communication terminals 120-1 to 120-3 which are all the communication terminals existing within the communication area 150. The beacon packet includes control information. Each of the first to third communication terminals 120-1 to 120-3 receives the beacon packet from the control device 110, and communicates with the control device 110 based on the control information included in the beacon packet. In this manner, a configuration of the wireless communication system 100 is basically the same as a configuration of the wireless communication system 10 shown in FIG. 13.

FIG. 1B shows the control device 110 and the communication terminals 120-1 to 120-3, which form the wireless communication system 100 according to the first embodiment of the present invention. In FIG. 1B, the control device 110 includes a first beacon packet generation section 1101, a first beacon packet transmission section 1102, a data communication section 1103, a second beacon packet generation section 1104, a second beacon packet transmission section 1105, and a channel change processing section 1106. The first communication terminal 120-1 includes a first beacon packet reception section 1201, a data communication section 1202, a second beacon packet reception section 1203, and a channel change processing section 1204. Although herein a description is given taking the first communication terminal 120-1 as an example, configurations and operations of the second communication terminal 120-2 and the third communication terminal 120-3 are the same as those of the first communication terminal 120-1.

The first beacon packet transmission section 1102 of the control device 110 transmits, to the first communication terminal 120-1, a first beacon packet generated by the first beacon packet generation section 1101. The first beacon packet reception section 1201 of the first communication terminal 120-1 receives the first beacon packet from the control device 110. Then, based on the first beacon packet, the data communication section 1103 of the control device 110 and the data communication section 1202 of the first communication terminal 120-1 communicate with each other.

The second beacon packet generation section 1104 of the control device 110 determines whether or not a use channel is to be changed from a currently used channel to another channel, based on a state of the communication between the control device 110 and the first communication terminal 120-1. Then, the second beacon packet generation section 1104 of the control device 110 generates a second beacon packet which includes information of whether or not the use channel is to be changed.

The second beacon packet transmission section 1105 of the control device 110 transmits, to the first communication terminal 120-1, the second beacon packet generated by the second beacon packet generation section 1104. The second beacon packet reception section 1203 of the first communication terminal 120-1 receives the second beacon packet from the control device 110. Then, the channel change processing section 1204 of the first communication terminal 120-1 changes the use channel based on the information of whether or not the use channel is to be changed, which is included in the second beacon packet.

On the other hand, the channel change processing section 1106 of the control device 110 changes the use channel, based on the determination, which has been performed by the second beacon packet generation section 1104, of whether or not the use channel is to be changed.

Contents and transmission/reception timings of the first beacon packet, contents and transmission/reception timings of the second beacon packet, and the determination of whether or not the use channel is to be changed, will be described in detail later.

FIG. 2 shows the communication terminals 120-1 to 120-3. In FIG. 2, each of the communication terminals 120-1 to 120-3 includes a control section 121, a memory 122, a modulation section 123, a demodulation section 124, a radio frequency section 125, and an antenna 126.

The control section 121 processes transmission data and reception data, based on an operation state of each of the communication terminals 120-1 to 120-3, which is held in the memory 122. The control section 121 generates the transmission data. The modulation section 123 converts the transmission data generated by the control section 121, into a transmission signal. The radio frequency section 125 converts the transmission signal resulting from the conversion performed by the modulation section 123, into a wireless signal, and transmits the wireless signal through the antenna 126. On the other hand, the wireless signal received by the antenna 126 is converted into a reception signal by the radio frequency section 125. The demodulation section 124 converts the reception signal resulting from the conversion performed by the radio frequency section 125, into reception data, and outputs the reception data to the control section 121.

Figure 3:
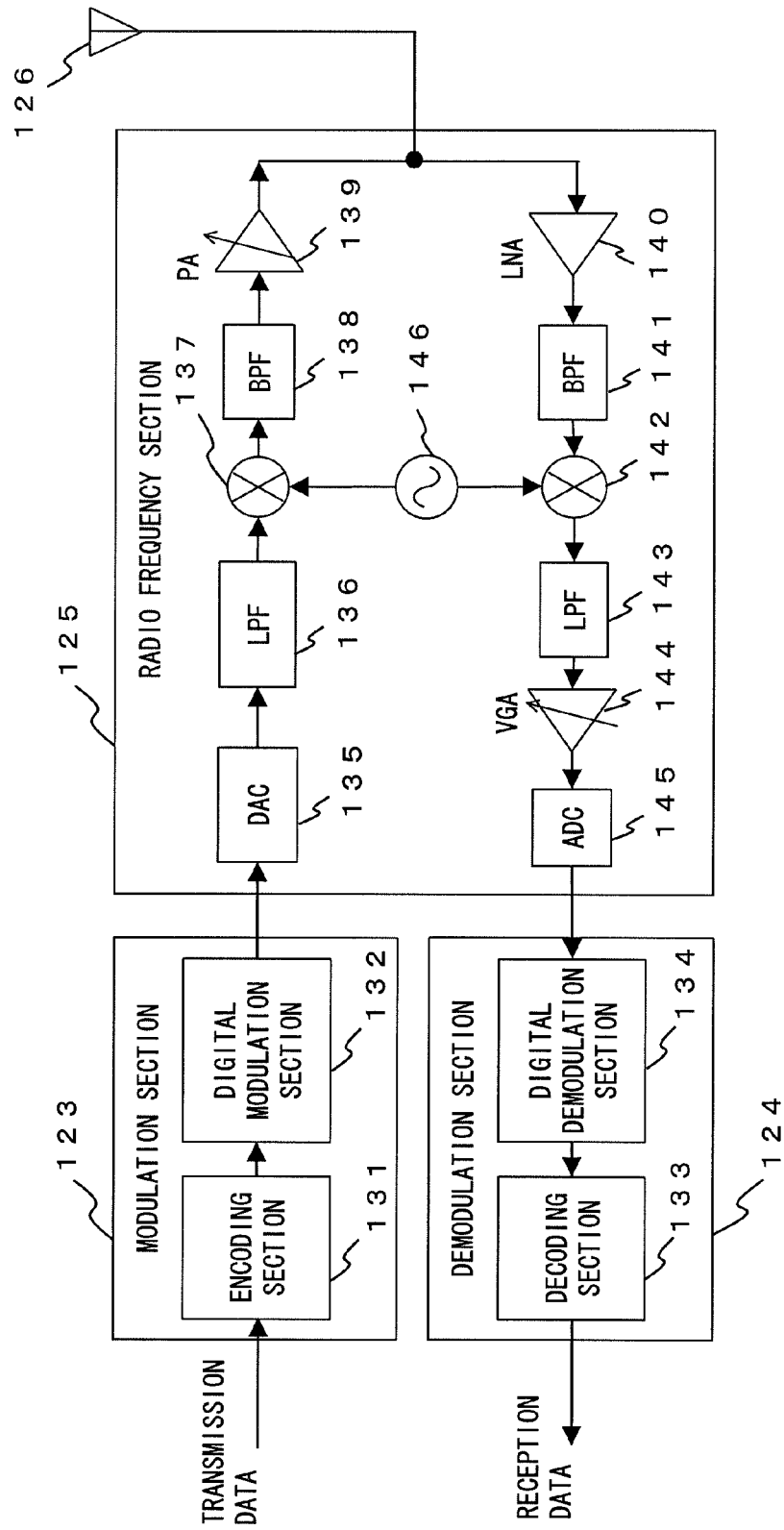
FIG. 3 shows a hardware block diagram of a modulation section 123, a demodulation section 124, and a radio frequency section 125, which are shown in FIG. 2.

FIG. 3 shows a hardware block diagram of the modulation section 123, the demodulation section 124, and the radio frequency section 125, which are shown in FIG. 2. In FIG. 3, the modulation section 123 includes an encoding section 131 and a digital modulation section 132, and the demodulation section 124 includes a decoding section 133 and a digital demodulation section 134. The radio frequency section 125 includes a digital-analog conversion section (DAC) 135, a low pass filter (LPF) 136, a mixer 137, a band pass filter (BPF) 138, a power amplifier (PA) 139, a low noise amplifier (LNA) 140, a band pass filter (BPF) 141, a mixer 142, a low pass filter (LPF) 143, a variable gain amplifier (VGA) 144, an analog-digital conversion section (ADC) 145, and a local oscillator 146.

In the modulation section 123, the encoding section 131 encodes the transmission data inputted from the control section 121. The digital modulation section 132 performs a digital modulation on the transmission data which has been encoded by the encoding section 131, and outputs resultant data as a transmission signal, to the radio frequency section 125. In the radio frequency section 125, the DAC 135 converts the inputted transmission signal from digital to analog. The transmission signal converted into analog has its frequency adjusted by the mixer 137 via the LPF 136. Moreover, the transmission signal having its frequency adjusted is, via the BPF 138, power-amplified by the PA 139, and transmitted as a wireless signal through the antenna 126. On the other hand, a wireless signal received by the antenna 126 is inputted to the radio frequency section 125. In the radio frequency section 125, the LNA 140 power-amplifies an inputted reception signal. The power-amplified reception signal has its frequency adjusted by the mixer 142 via the BPF 141. The reception signal having its frequency adjusted has, furthermore, its gain adjusted by the VGA 144 via the LPF 143. The ADC 145 converts the reception signal having its gain adjusted, from analog to digital, and outputs the reception signal converted to digital, to the demodulation section 124. In the demodulation section 124, the digital demodulation section 134 digital-demodulates the inputted reception signal. The decoding section 133 decodes the digital-demodulated reception signal, and outputs a resultant signal as reception data, to the control section 121. The mixers 137 and 142 are controlled by the local oscillator 146.

The modulation section 123 and the demodulation section 124 may be realized by a digital signal processing circuit, or signal processing may be realized by a processor such as a DSP (Digital Signal Processor).

A configuration of the control device 110 is the same as the configuration of each of the communication terminals 120-1 to 120-3 which is shown in FIGS. 2 and 3. A difference between the operation of the control device 110 and the operation of each of the communication terminals 120-1 to 120-3 is under control of the control section 121.

Figure 4:
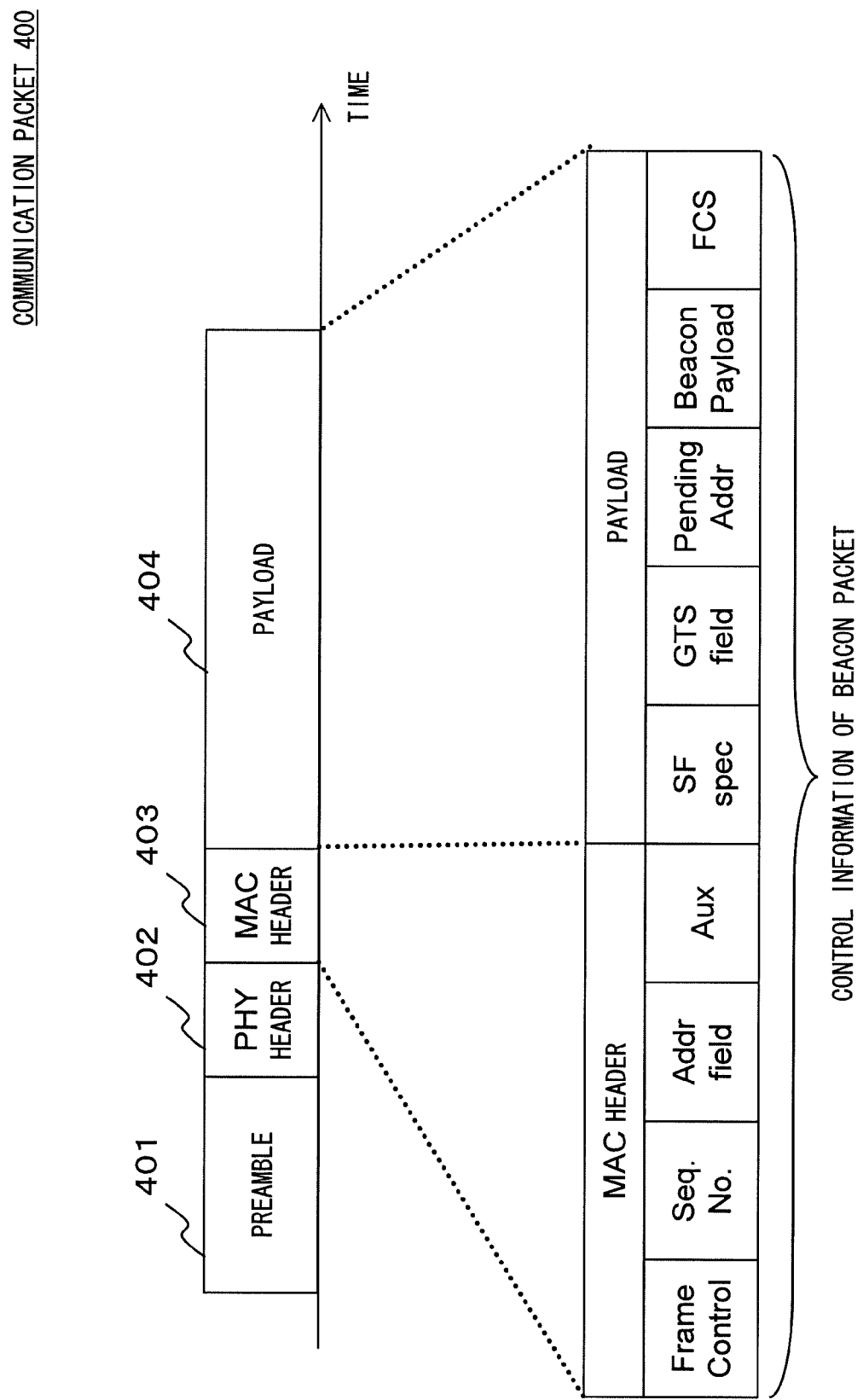
FIG. 4 shows a communication packet 400.

FIG. 4 shows a communication packet 400. In FIG. 4, the communication packet 400 includes a preamble 401, a PHY (Physical) header 402, a MAC (Media Access Control) header 403, and a payload 404. The preamble 401 stores data for the demodulation section 124 synchronizing a time and a frequency of the communication packet. The PHY header 402 stores parameters necessary for a demodulation, such as a start position of data, a modulation scheme, and a data length. The MAC header 403 stores parameters necessary for an access, such as an address and a control command. The payload 404 stores transmission data and control data. Information indicating a type of data stored in the payload 404, that is, for example, whether the data is the beacon packet or a data packet, is stored in the MAC header 403.

Furthermore, when the communication packet is the beacon packet, the MAC header 403 and the payload 404 store control information of the beacon packet. The control information of the beacon packet will be described in detail below.

The MAC header 403 includes a frame control field (FrameControl), a sequence number (Seq.No.), an address field (AddrField), and an other field (Aux). The frame control field stores information indicating a type of data stored in the payload 404, that is, information indicating the beacon packet. The sequence number stores information indicating a sequence of the communication packet, and the like. The address field stores information indicating a source address and a destination address of the communication packet, and the like. The other field stores information concerning security and encryption, and the like.

When it is determined that the communication packet 400 is the beacon packet based on the frame control field of the MAC header 403 of the communication packet 400, it can be recognized that the control information of the beacon packet is stored in the payload 404.

The payload 404 includes a superframe field (SFspec), a slot reservation field (GTSfield), a pending address field (PendingAddr), a beacon payload field (BeaconPayload), and a frame check sequence field (FCS).

The superframe field (SFspec) stores information concerning a frame structure, such as a transmission interval of the beacon packet, the length of an active period, and the length of an inactive period.

The slot reservation field (GTSfield) stores information concerning a reservation for a time slot.

The pending address field (PendingAddr) stores information concerning a notification that there is data addressed to the communication terminal. For example, when the control device 110 prepares data addressed to the first communication terminal 120-1, an address of the first communication terminal 120-1 is set in the pending address field, and the beacon packet is broadcast. The first to third communication terminals 120-1 to 120-3, which exist within the communication area 150, confirm the address set in the pending address field of the received beacon packet. Here, the first communication terminal 120-1, of which the address is coincident with the address set in the pending address field, requests data from the control device 110. Thus, the control device 110 transmits the data prepared and addressed to the first communication terminal 120-1, to the first communication terminal 120-1.

The beacon payload field (BeaconPayload) stores other control information concerning the beacon packet.

The frame check sequence field (FCS) is added in order to detect a reception error of the above-described fields.

Figure 5:
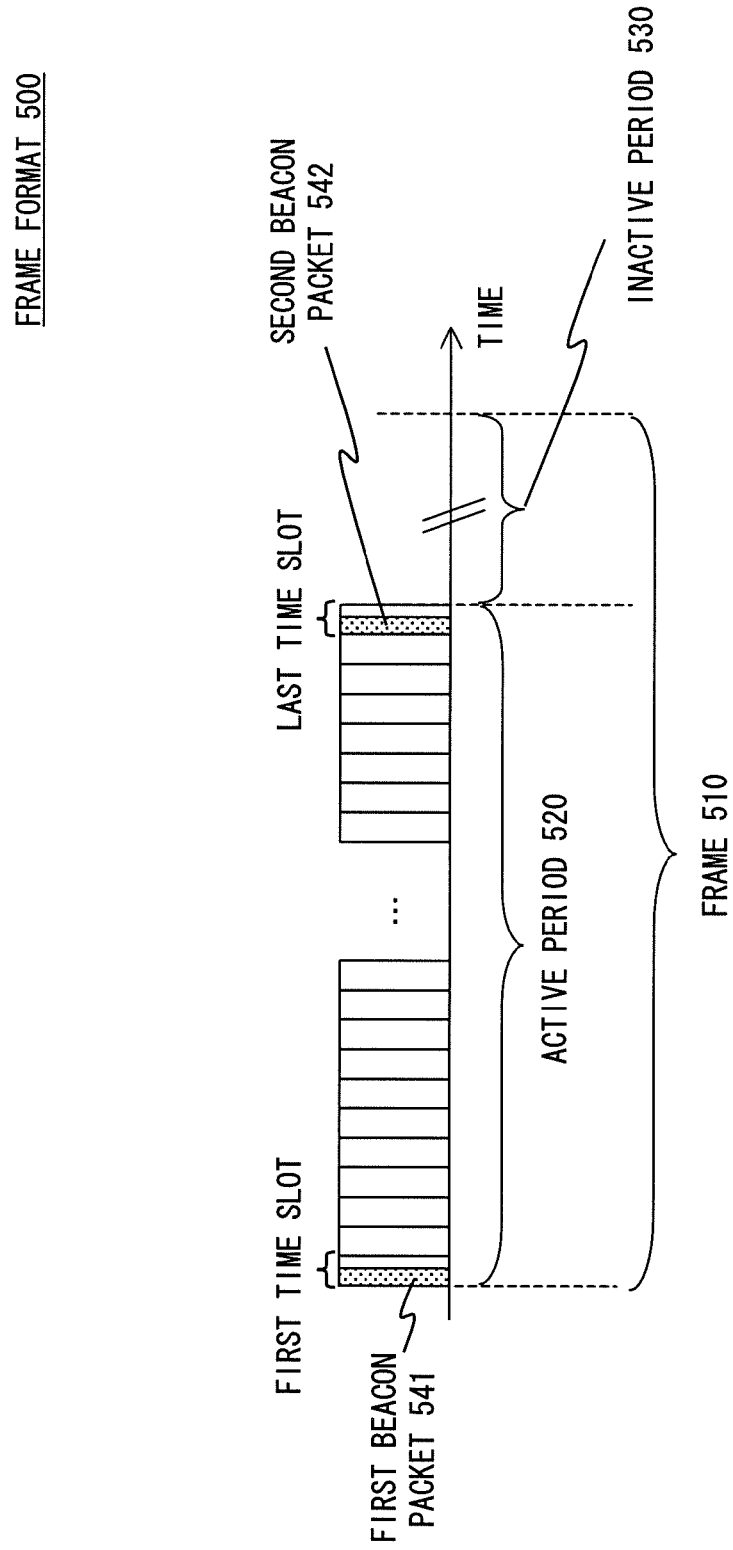
FIG. 5 shows a frame format 500 according to the first embodiment of the present invention.

FIG. 5 shows a frame format 500 according to the first embodiment of the present invention. In FIG. 5, a frame 510 which is described in the frame format 500 includes an active period 520 and an inactive period 530.

The active period 520 is a period in which each of the communication terminals 120-1 to 120-3 performs communication, and has a plurality of time slots. The plurality of time slots of the active period 520 are shared among all the communication terminals existing within the network of the wireless communication system 100.

Among the plurality of time slots of the active period 520, the first time slot is allocated as a period for receiving a first beacon packet 541. In the first time slot, the control device 110 broadcasts the first beacon packet 541 to the first to third communication terminals 120-1 to 120-3 which are all the communication terminals existing within the communication area 150. The first beacon packet 541 includes, as shown in FIG. 4, control information concerning the frame 510, such as the number of time slots of the active period 520, allocation of the time slots, the length of the active period 520, the length of the inactive period 530, and a time until transmission of the next beacon packet.

Among the plurality of time slots of the active period 520, the time slots other than the first time slot are used for communication between the control device 110 and each of the communication terminals 120-1 to 120-3. For example, the Slotted-CSMA may be used as a communication protocol. Alternatively, a part of the plurality of time slots may be reserved for each communication terminal, so that communication can be performed without a collision between communication terminals. For example, according to the IEEE 802.15.4 standard, a first half of the plurality of time slots of the active period is used for contention access, and a second half thereof is reserved for contention-free access.

On the other hand, the inactive period 530 is a period in which each of the communication terminals 120-1 to 120-3 does not perform communication. In the inactive period 530, each of the communication terminals 120-1 to 120-3 is in a sleep mode, and thereby the power consumption is reduced.

Figure 14:
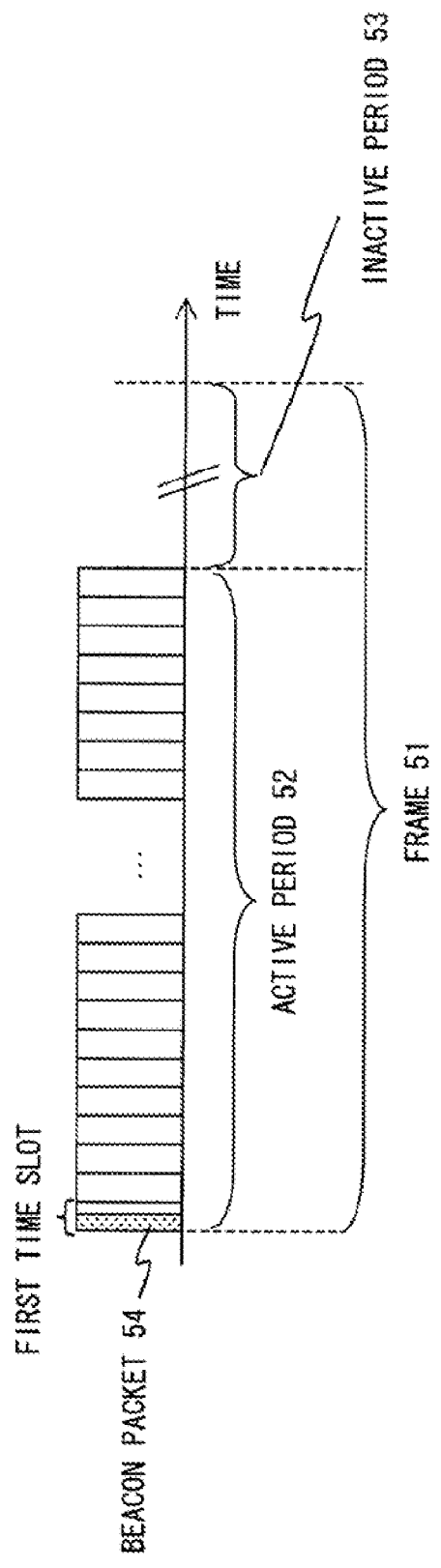
FIG. 14 shows a conventional frame format 50.
Figure 15:
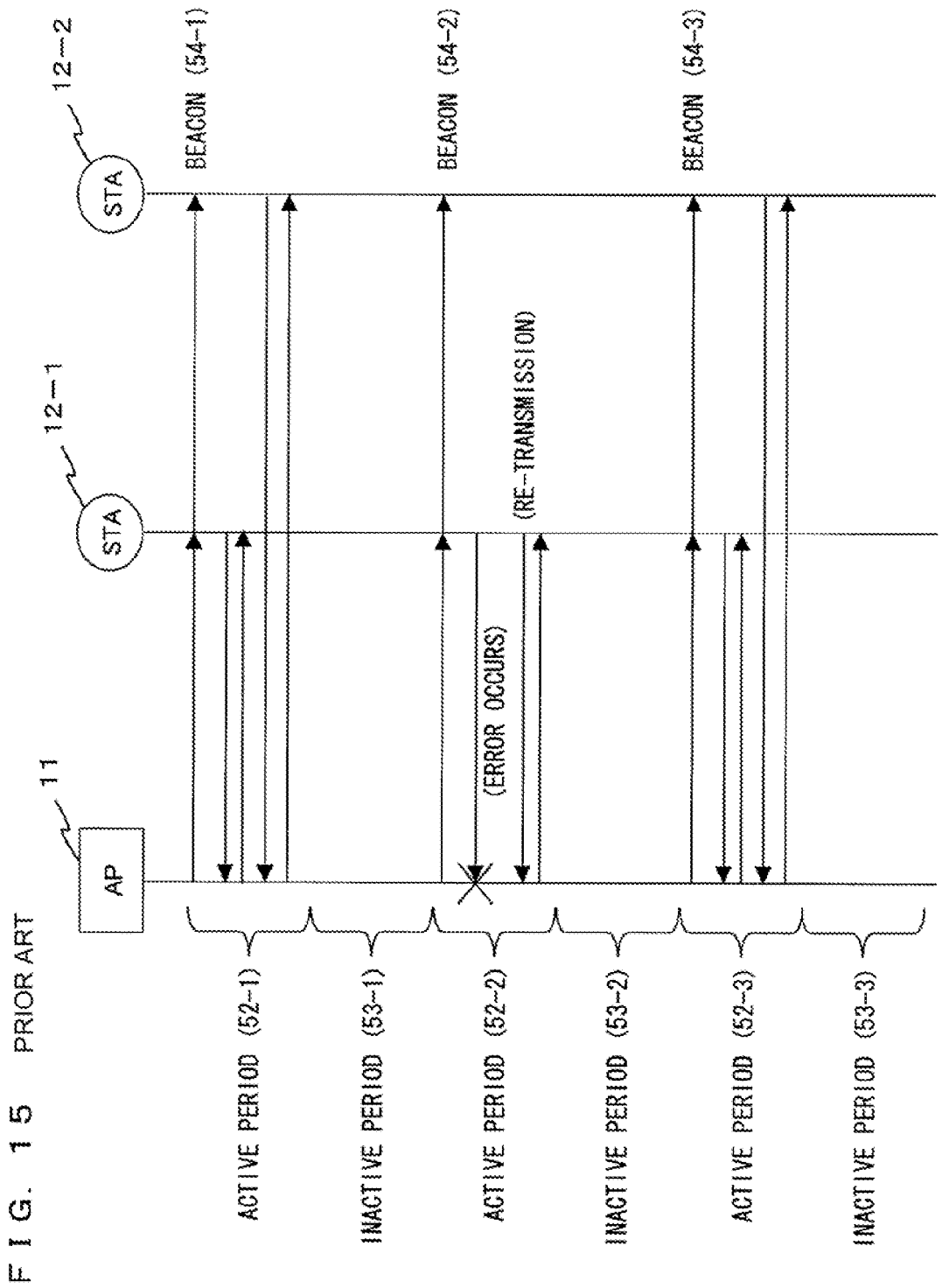
FIG. 15 shows a communication sequence between a control device 11 and each of communication terminals 12-1 to 12-3 in the wireless communication system 10.
Figure 16:
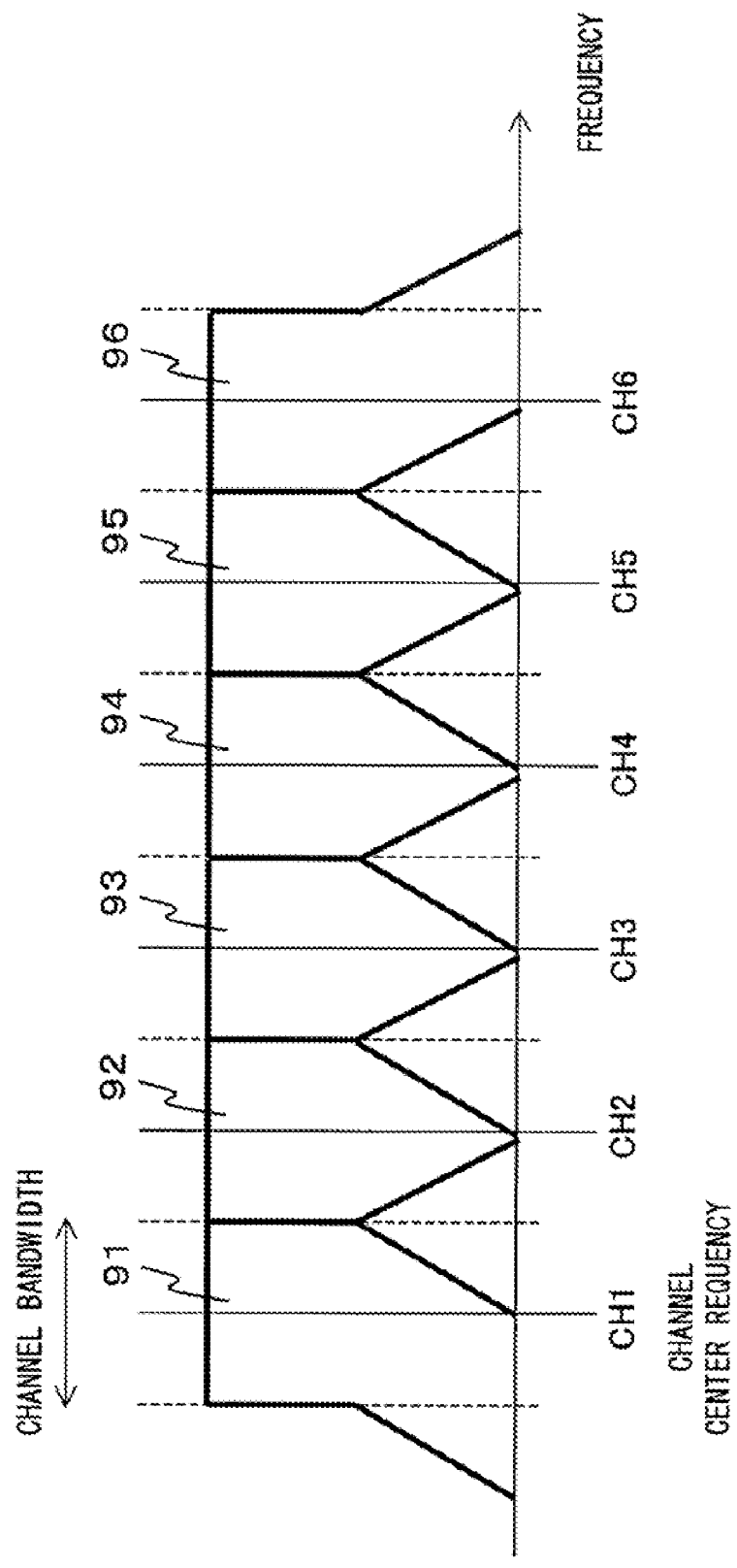
FIG. 16 shows an example of a channel bandwidth of a wireless channel.

Thus far, the frame format 500 according to the first embodiment is similar to the conventional frame format 50 shown in FIG. 14. The frame format 500 according to the first embodiment of the present invention is different from the conventional frame format 50 shown in FIG. 14, in that, among the plurality of time slots of the active period 520, the last time slot is allocated as a period for transmitting and receiving a second beacon packet 542.

In the last time slot among the plurality of time slots of the active period 520, the control device 110 broadcasts the second beacon packet 542 to the first to third communication terminals 120-1 to 120-3 which are all the communication terminals existing within the communication area 150.

Similarly to the first beacon packet 541, the second beacon packet 542 may include control information concerning the frame 510, such as the number of time slots of the active period 520, allocation of the time slots, the length of the active period 520, the length of the inactive period 530, and a time until transmission of the next beacon packet, as shown in FIG. 4.

A difference between the first beacon packet 541 and the second beacon packet 542 will further be described in detail.

Figure 6A:
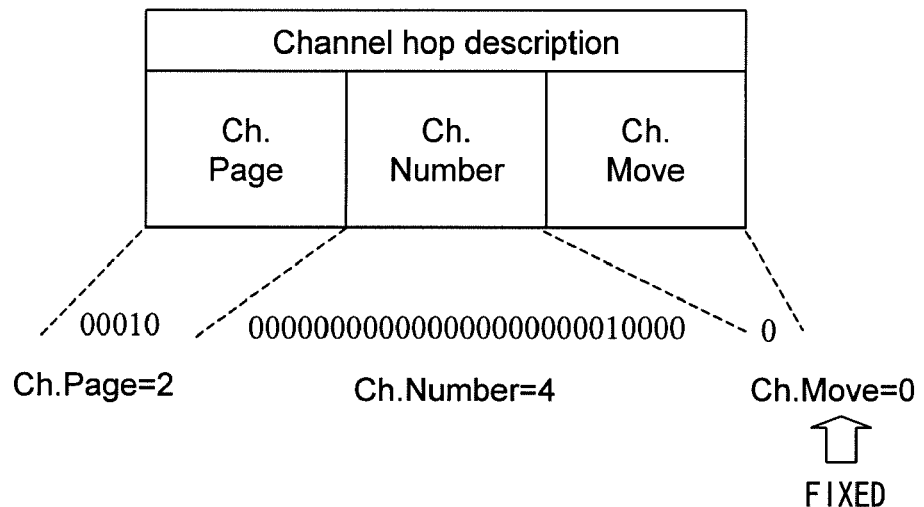
FIG. 6A shows a first beacon packet 541.

FIG. 6A shows the first beacon packet 541. The first beacon packet 541 notifies (advance notification) information concerning a candidate channel to which the use channel is possibly changed from the currently used channel. Specifically, the first beacon packet 541 includes a channel page field (Ch.Page), a channel number field (Ch.No.), and a channel move field (Ch.Move).

The channel page field specifies a set of channel numbers. For example, the channel page field indicates a difference of frequency bands to be used, and is used for a selection of a frequency band for the communication terminal usable in a multiband, such as the 868 MHz band, the 915 MHz band, the 950 MHz band, and the 2.4 GHz band. In FIG. 6A, in the channel page field, 5-bits binary data "00010" is set, which specifies "2" in decimal number. The channel page field indicates where in the order of frequency bands, which are preliminarily determined by a system, a frequency band is. For example, when the frequency band of the system is determined to be the 868 MHz band, the 915 MHz band, the 950 MHz band, and the 2.4 GHz band in this order, Ch.Page=2 shown in FIG. 6A indicates the 915 MHz band which is the second frequency band.

The channel number field specifies a channel number in the frequency band specified by the channel page field. A channel bandwidth or the number of channels may be different for each frequency band. Correspondence between a channel number and an actual channel frequency is preliminarily defined within a communication system. In FIG. 6A, the channel number field is represented in a 27-bit bit map. The bit 0 corresponds to the channel number 0, the bit 1 corresponds to the channel number 1, and the bit 26 corresponds to the channel number 26, respectively. In FIG. 6A, in the channel number field, the bit 4 is set to be "1", and a channel number 4 corresponding to the bit 4 is specified. Similarly to the channel page field, the channel number field indicates a channel number in a frequency band which is preliminarily determined by the system. Ch.No.=4 shown in FIG. 6A indicates the channel number 4 within the 915 MHz band which is indicated by the Ch.Page=2 mentioned above.

The channel move field specifies whether or not the use channel is to be changed to a channel that is specified by the channel page field and the channel number field. For example, when "0" is set in the channel move field, it indicates that the use channel is not to be changed from the currently used channel. On the other hand, when "1" is set in the channel move field, it indicates that the use channel is to be changed from the currently used channel to the channel specified by the channel page field and the channel number field. In FIG. 6A, "0" is set in the channel move field, which indicates that the use channel is not to be changed from the currently used channel. That is, the first beacon packet 541 is an advance notification for notifying information concerning a candidate channel to which the use channel is possibly changed, by using the channel page field and the channel number field. In other words, since the first beacon packet 541 is the advance notification for notifying the information concerning the candidate channel, a value in the channel move field is fixedly set to be "0".

Figure 6B:
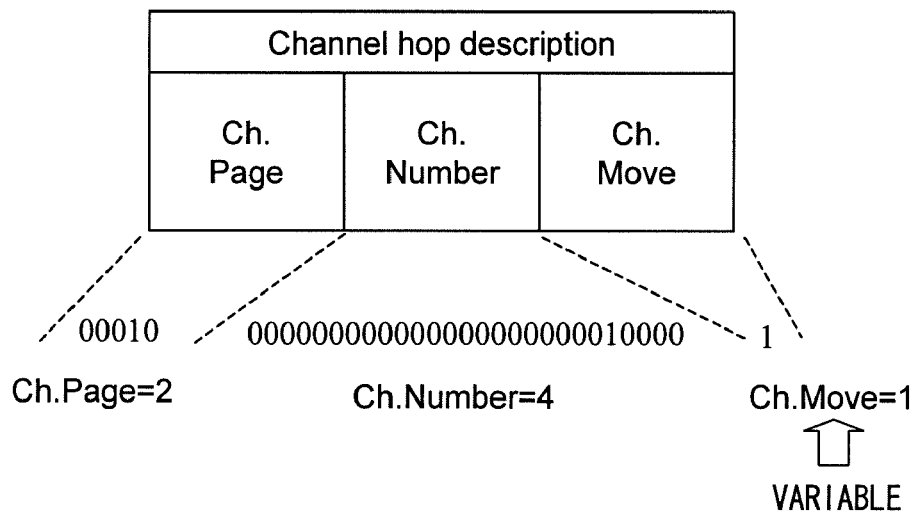
FIG. 6B shows a second beacon packet 542.

FIG. 6B shows the second beacon packet 542. A configuration of the second beacon packet 542 is the same as the first beacon packet 541 shown in FIG. 6A. In FIG. 6B, "1" is set in the channel move field of the second beacon packet 542, which indicates that the use channel is to be changed from the currently used channel to the channel specified by the channel page field and the channel number field. That is, the second beacon packet 542 is a determinate notification for notifying that the use channel is to be changed to the channel number 4 of the channel page No. 2. In other words, since the second beacon packet 542 is the determinate notification for notifying that the use channel is to be changed, a value in the channel move field is variable, that is, the value is set to be "1" when the use channel is to be changed, and set to be "0" when the use channel is not to be changed.

The channel specified by the channel page field and the channel number field of the second beacon packet 542 may be either the same as or different from the channel specified by the channel page field and the channel number field of the first beacon packet 541.

The first beacon packet 541 has to include at least the information concerning the candidate channel. The information concerning the candidate channel is information concerning one or a plurality of channels to which the use channel is possibly changed from the currently used channel in the next and subsequent frames.

The second beacon packet 542 has to include at least the information of whether or not the use channel is to be changed from the currently used channel.

The channel number is represented in a bit map form, but this is not limitative. For example, a method of representing the channel number in binary number may be adopted. In addition, the channel move field may be represented in a bit map form, in order to notify whether or not the use channel is to be changed from each communication terminal.

In FIG. 6A and FIG. 6B, the information concerning the candidate channel and the information of whether or not the use channel is to be changed may be represented in one or a plurality of bit fields, and may be provided for each communication terminal. Moreover, the one or the plurality of bit fields may be provided as a part of the control information of the beacon packet shown in FIG. 4, or may be provided as a part of another control packet.

FIG. 7 shows a situation in which the first communication terminal 120-1 changes the use channel by using the frame 510 which is described in the frame format 500 shown in FIG. 5. In FIG. 7, communication of a frame 510-1 is performed using a channel CH1. In the frame 510-1, in the first time slot of the active period 520-1, the control device 110 transmits a first beacon packet 541-1 to the first communication terminal 120-1, to give an advance notification of the channel CH2 as the information concerning the candidate channel.

Here, it is assumed that, in the active period 520-1, the channel CH1 is largely influenced by interference from another network system. The control device 110 determines that communication with the first communication terminal 120-1 cannot be normally performed in the channel CH1. In the frame 510-1, in the last time slot of the active period 520-1, the control device 110 transmits a second beacon packet 542-1 to the first communication terminal 120-1, to give a determinate notification that the use channel is to be changed from the currently used channel CH1 to the channel CH2 which is the candidate channel.

After the active period 520-1 ends, in an inactive period 530-1, the first communication terminal 120-1 changes the use channel from the channel CH1 to the channel CH2.

The control device 110 and the first communication terminal 120-1 perform communication of a next frame 510-2, by using the channel CH2. When it is determined that, in the active period 520-2, the channel CH2 is largely influenced by interference from another network system, the use channel is further changed from the channel CH2 to the channel CH3.

Figure 17:
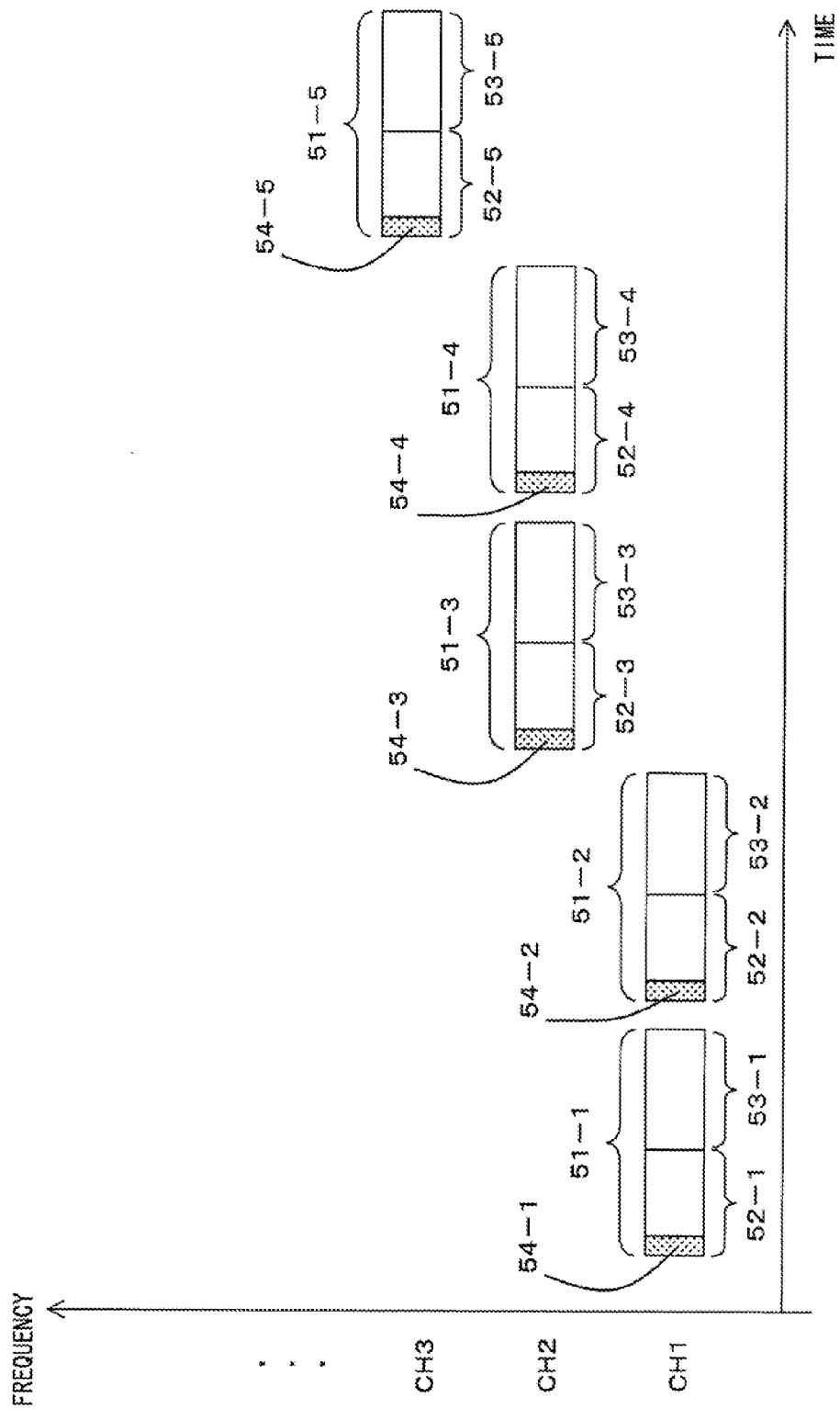
FIG. 17 shows a situation in which the first communication terminal 12-1 changes a use channel by using a frame 51 which is described in the frame format 50 shown in FIG. 14.

In this manner, when the frame format 500 shown in FIG. 5 is used, the determinate notification for changing the use channel is given by using the second beacon packet, in the last time slot of the active period of the frame that is determined, by the control device 110, to be largely influenced by interference from another network system. In the inactive period of the frame, the first communication terminal 120-1 changes the use channel to a channel that is determined, by the determinate notification, to be a channel to which the use channel is to be changed, and enters the sleep mode. Thereby, comparing a situation shown in FIG. 17 in which the use channel is changed in the conventional manner and the situation shown in FIG. 7 in which the use channel is changed in the manner according to the present embodiment, the control device 110 and the first communication terminal 120-1 according to the present embodiment can, by using the channel to which the use channel has been changed, unfailingly communicate a next frame subsequent to the frame that has been determined, by the control device 110, to be largely influenced by interference from another network system.

FIG. 8 shows a communication sequence between the control device 110 and each of the communication terminals 120-1 to 120-3 in the wireless communication system 100. Here, for convenience of the description, the third communication terminal 120-3 is omitted.

In the first time slot of the active period 520-1, the control device 110 broadcasts the first beacon packet 541-1 to each of the communication terminals 120-1 and 120-2. Each of the communication terminals 120-1 and 120-2 receives the first beacon packet 541-1 from the control device 110, and acquires the control information included in the first beacon packet 541-1. As described above, the first beacon packet 541-1 includes the information concerning the candidate channel.

Subsequently, in the active period 520-1, the control device 110 and each of the communication terminals 120-1 and 120-2 communicate with each other. Here, the channel used for the current communication is largely influenced by interference from another network system, and in the active period 520-1, communication from each of the communication terminals 120-1 and 120-2 to the control device 110 fails. In this case, the control device 110 determines that the communication with each of the communication terminals 120-1 and 120-2 cannot be normally performed with the currently used channel.

In the last time slot of the active period 520-1, the control device 110 broadcasts the second beacon packet 542-1 to each of the communication terminals 120-1 and 120-2. Each of the communication terminals 120-1 and 120-2 receives the second beacon packet 542-1 from the control device 110, and acquires the control information included in the second beacon packet 542-1. As described above, the second beacon packet 542-1 includes the information of whether or not the use channel is to be changed. Specifically, as shown in FIG. 6B, "1" is set in the channel move field, which indicates that the use channel is to be changed from the currently used channel to a channel specified by the channel page field and the channel number field.

After the active period 520-1 ends, in the inactive period 530-1, the control device 110 and each of the communication terminals 120-1 and 120-2 perform a channel change process for changing the use channel to the channel notified in the second beacon packet 542-1, and then enters the sleep mode. In the inactive period 530-1, the control device 110 and each of the communication terminals 120-1 and 120-2 do not communicate with each other. In the inactive period 530-1, the control device 110 and each of the communication terminals 120-1 and 120-2 enter the sleep mode, and thereby power consumption can be reduced. Here, the length of the inactive period 530-1 is preliminarily notified by the control information included in the beacon packet.

When the inactive period 530-1 ends and the next active period 520-2 starts, the control device 110 and each of the communication terminals 120-1 and 120-2 recover from the sleep mode to the operation mode, and prepare for communication of the next frame. In the active period 520-2, in the first time slot, the control device 110 broadcasts the first beacon packet 541-2 to each of the communication terminals 120-1 and 120-2, by using the channel to which the use channel has been changed. Since the control device 110 and each of the communication terminals 120-1 and 120-2 have already changed the use channel to the previously notified channel, the first beacon packet 541-2 includes information concerning a candidate channel to which the use channel is possibly changed subsequently.

In the active period 520-2, the control device 110 and each of the communication terminals 120-1 and 120-2 communicate with each other by using the channel to which the use channel has been changed. Accordingly, in the active period 520-2, influence of interference from another network system can be avoided, and the communication from each of the communication terminals 120-1 and 120-2 to the control device 110 is successfully performed. In this case, the control device 110 determines that the use channel is not to be changed.

Then, in the last time slot of the active period 520-2, the control device 110 broadcasts a second beacon packet 542-2 to each of the communication terminals 120-1 and 120-2. Each of the communication terminals 120-1 and 120-2 receives the second beacon packet 542-2 from the control device 110, and acquires the control information included in the second beacon packet 542-2. As described above, the second beacon packet 542-2 includes the information indicating that the use channel is not to be changed. Specifically, "0" is set in the channel move field shown in FIG. 6B, which indicates that the use channel is not to be changed from the currently used channel to a channel specified by the channel page field and the channel number field.

After the active period 520-2 ends, in an inactive period 530-2, the control device 110 and each of the communication terminals 120-1 and 120-2 enter the sleep mode. Subsequently, the above-described operation is repeated in the same manner.

Figure 18:
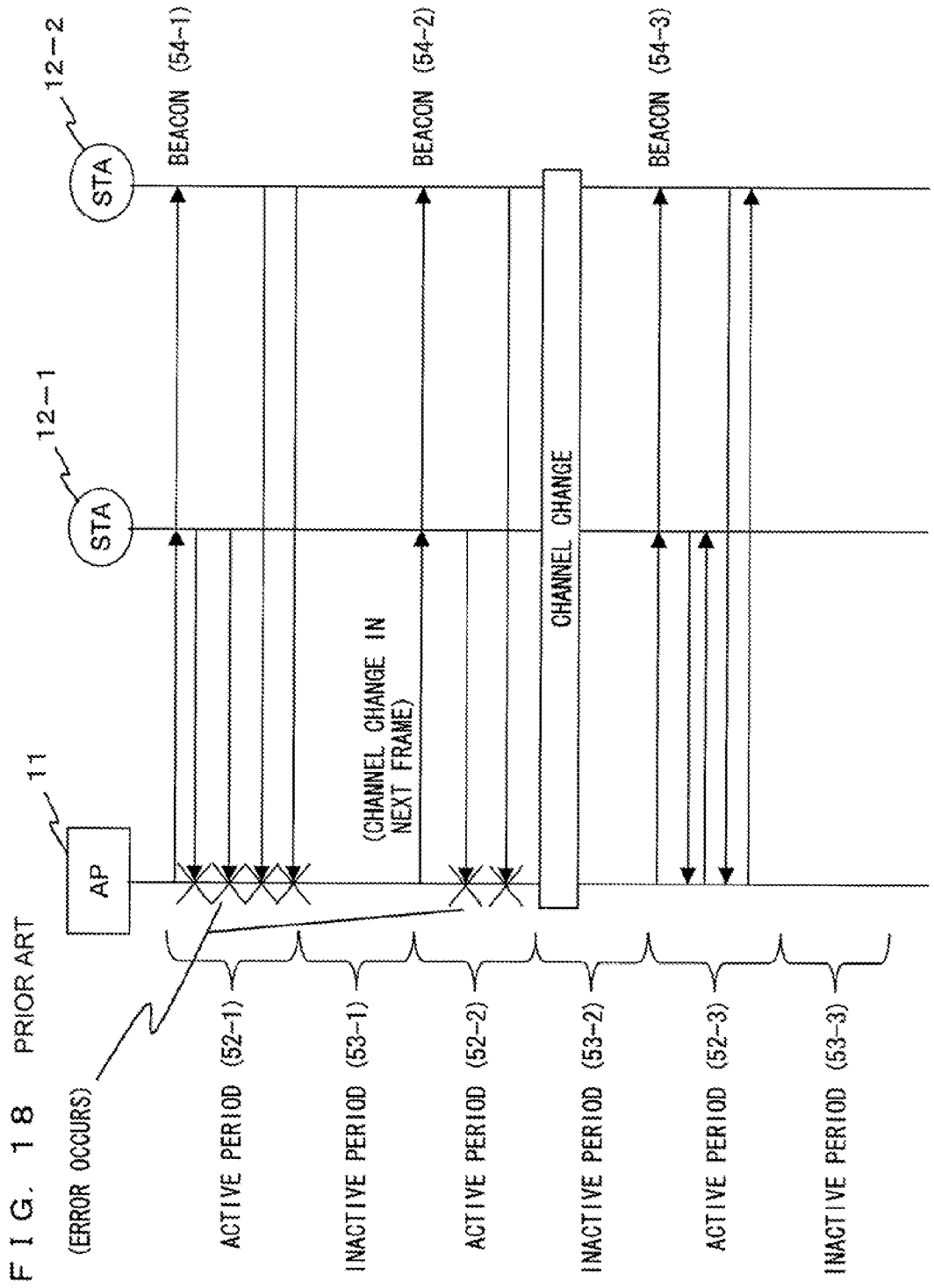
FIG. 18 shows a communication sequence between the control device 11 and each of the communication terminals 12-1 to 12-3 in the wireless communication system 10.

In this manner, by using the first beacon packet and the second beacon packet, a channel of the entire network can be changed in a short time after the control device 110 determines that influence of interference from another network system is large. This can reduce a possibility that congestion further increases due to a communication state in the network being deteriorated during a period from when the control device 110 determines that influence of interference from another network system is large to when the use channel is actually changed. Comparing a conventional communication sequence shown in FIG. 18 and the communication sequence according to the present embodiment shown in FIG. 8, the control device 110 and the first communication terminal 120-1 according to the present embodiment can, by using the channel to which the used channel has been changed, unfailingly communicate a next frame subsequent to the frame that has been determined, by the control device 110, to be largely influenced by interference from another network system.

Figure 9:
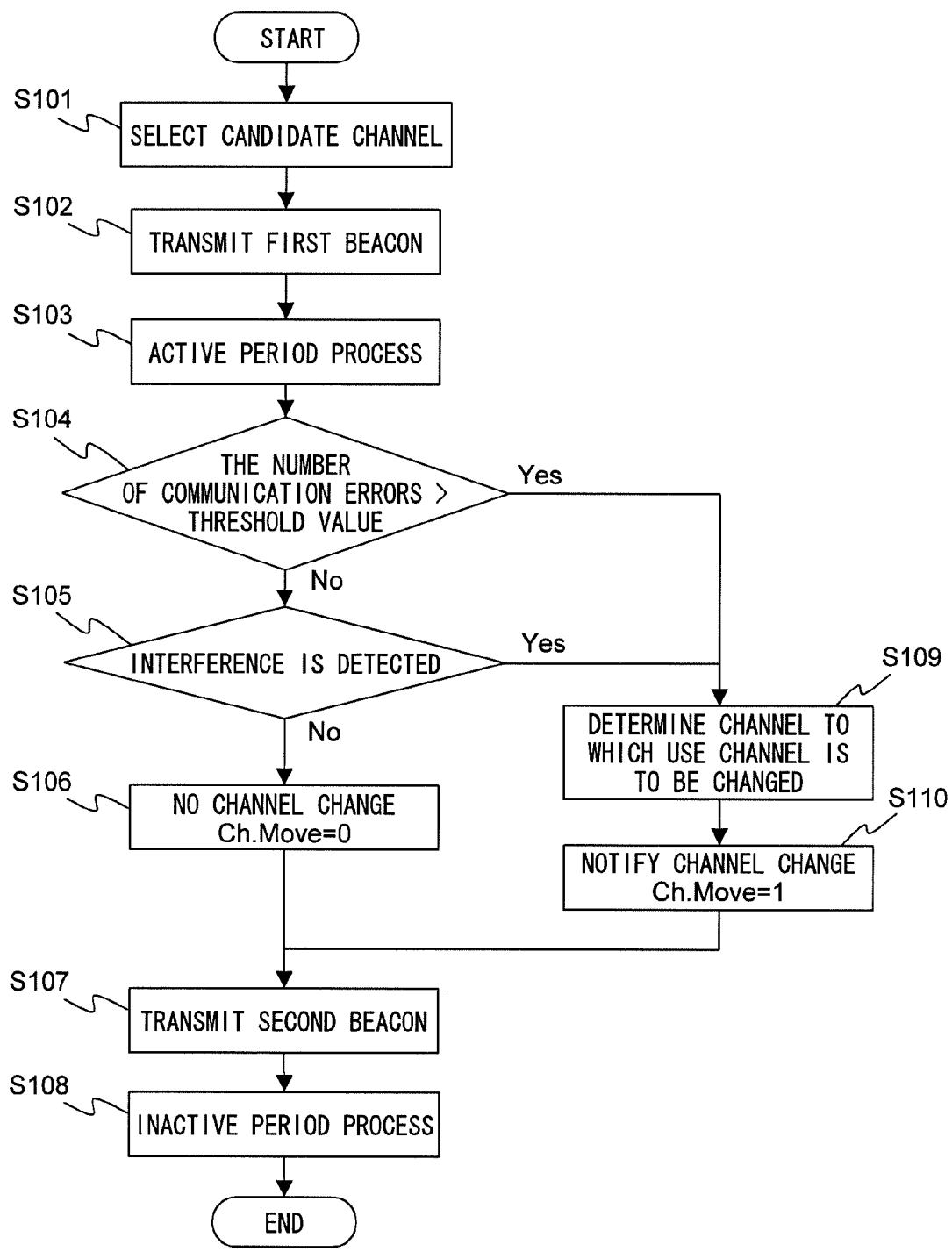
FIG. 9 shows a control flow of the control device 110.

FIG. 9 shows a control flow of the control device 110. In step S101, the control device 110 selects a candidate channel to which the use channel is possibly changed from the currently used channel. Here, the number of candidate channels may be one or more. In a case where a plurality of candidate channels are selected, it is preferred to prioritize the plurality of candidate channels.

In step S102, in the first time slot of the active period, the control device 110 broadcasts the first beacon packet to all the communication terminals within the communication area 150. The first beacon packet includes information concerning the candidate channel selected in step S101.

In step S103, the control device 110 performs an active period process. The control device 110 performs a communication process for communication with the communication terminals within the communication area 150.

In step S104, the control device 110 determines a state of the communication process performed in step S103. The control device 110 determines whether or not the number of communication errors exceeds a predetermined threshold value, in the communication process for communication with each of the communication terminals. When the number of communication errors exceeds the predetermined threshold value (Yes in step S104), the process advances to step S109. When the number of communication errors is equal to or less than the predetermined threshold value (No in step S104), the process advances to step S105.

In step S105, the control device 110 determines whether or not interference from another network system is detected, based on information other than the number of communication errors. For example, when a reception level or a noise level exceeds a predefined threshold value in a time slot in which no communication is performed, it may be determined that some kind of interference signal exists. When interference is detected (Yes in step S105), the process advances to step S109. When interference is not detected (No in step S105), the process advances to step S106.

When each communication terminal detects a reception error for a communication packet from the control device 110, the communication terminal requests the control device 110 to re-transmit the communication packet. The determination of the communication state, which is performed in step S104 and step S105, may be performed based on whether or not there is the request for re-transmission. In addition, it is preferred that the determination of the communication state, which is performed in step S104 and step S105, is performed based also on information of the reception level. For example, when the reception level is low and a reception error occurs, the cause of the reception error is that a distance of communication between the control device 110 and each communication terminal is large. In this case, therefore, it may be determined that a communication failure due to interference does not occur. On the other hand, when a reception error occurs even though the reception level is high, it may be determined that the reception level rises because of superimposition of an interference signal, and thus it may be determined that a communication failure due to interference occurs.

In step S106, the control device 110 determines that the use channel is not to be changed, and sets "0" in the channel move field.

On the other hand, in step S109, the control device 110 determines that the use channel is to be changed, and determines a channel to which the use channel is to be actually changed. Then, in step S110, the control device 110 sets "1" in the channel move field. Here, which channel the use channel is actually changed to is determined by various methods.

For example, a channel sensing may be performed during the inactive period, and a channel in which less interference occurs may be selected.

In step S107, in the last time slot of the active period, the control device 110 broadcasts the second beacon packet to all the communication terminals within the communication area 150. The second beacon packet includes information concerning a channel to which the use channel is to be actually changed or information concerning a candidate channel, which are set in step S110 or step S106.

In step S108, the control device 110 performs an inactive period process. When the use channel is to be changed, the control device 110 performs the channel change process and then enters the sleep mode. On the other hand, when the use channel is not to be changed, the control device 110 enters the sleep mode without any process. In this manner, the control device 110 completes a one-frame process.

Figure 10:
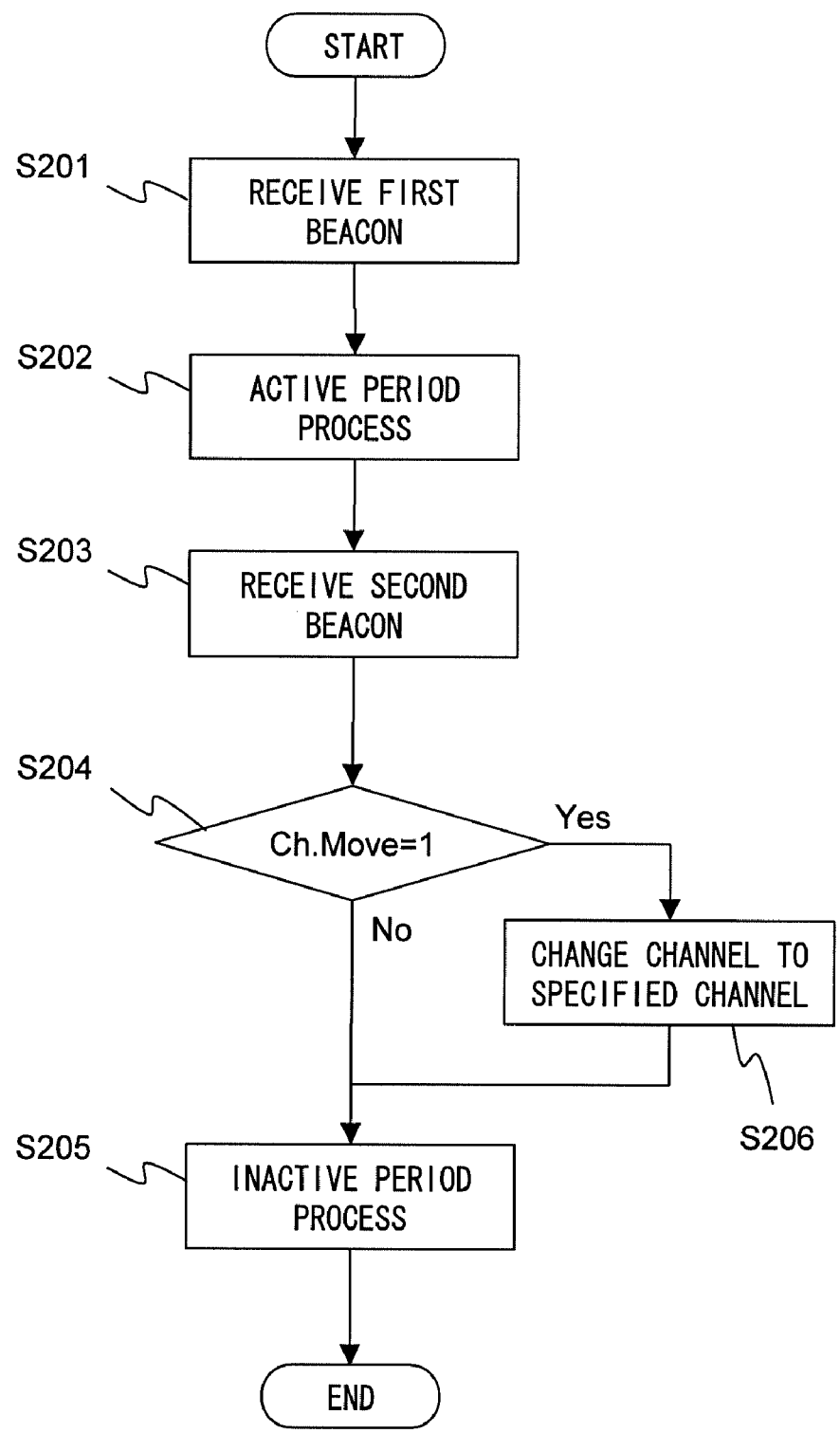
FIG. 10 shows a control flow of each of the communication terminals 120-1 to 120-3.

FIG. 10 shows a control flow of each of the communication terminals 120-1 to 120-3. Here, a control flow of the first communication terminal 120-1 will be described.

In step S201, in the first time slot of the active period, the first communication terminal 120-1 receives the first beacon packet from the control device 110. The first beacon packet includes information concerning a candidate channel to which the use channel is possibly changed from the currently used channel.

In step S202, the first communication terminal 120-1 performs the active period process. The first communication terminal 120-1 performs the communication process for communication with the control device 110.

In step S203, in the last time slot of the active period, the first communication terminal 120-1 receives the second beacon packet from the control device 110. The second beacon packet includes information of whether or not the use channel is to be changed.

In step S204, when "1" is set in the channel move field included in the second beacon packet (Yes in step S204), the first communication terminal 120-1 advances the process to step S206. On the other hand, when "0" is set in the channel move field included in the second beacon packet (No in step S204), the first communication terminal 120-1 advances the process to step S205.

In step S206, the first communication terminal 120-1 performs the channel change process for changing the use channel, and then advances the process to step S205.

In step S205, the first communication terminal 120-1 performs the inactive period process. In order to reduce the power consumption, the first communication terminal 120-1 enters the sleep mode. In this manner, the first communication terminal 120-1 completes a one-frame process.

As described above, in the wireless communication system 100 according to the first embodiment of the present invention, the control device 110: broadcasts the first beacon packet 541 to the first to third communication terminals 120-1 to 120-3, in the first time slot of the active period; generates the second beacon packet 542 based on the communication state in the active period; and broadcasts the second beacon packet 542 in the last time slot of the active period. Accordingly, when the control device 110 determines that influence of interference from another network system is large in the communication with the first to third communication terminals 120-1 to 120-3, the control device 110 selects a channel from the plurality of channels so as to avoid the interference from another network system, and causes the communication terminals in the network to change the use channel, during the inactive period in the same frame. This can reduce the possibility that congestion further increases due to the communication state in the network being deteriorated during a period from when the control device 110 determines that influence of interference from another network system is large to when the use channel is actually changed. In the next frame subsequent to the frame that has been determined, by the control device 110, to be largely influenced by interference from another network system, communication can be unfailingly performed by using the channel to which the used channel has been changed.

A time required for the channel change process varies for each communication terminal, and some communication terminals require a long time for the process of changing the use channel. In the wireless communication system 100 according to the first embodiment of the present invention, all the communication terminals perform the channel change process during the inactive period. Therefore, at the start of the active period in the next frame, communication can be unfailingly performed by using the channel to which the use channel has been changed.

In addition, in the wireless communication system 100 according to the first embodiment of the present invention, the control device 110 and each of the communication terminals 120-1 to 120-3 do not communicate with each other in the inactive period. Therefore, a time for the sleep mode can be ensured. That is, the control device 110 and each of the communication terminals 120-1 to 120-3 can ensure low power consumption.

Second Embodiment

In the first embodiment of the present invention, the case where each of the communication terminals 120-1 to 120-3 successfully receives the first beacon packet and the second beacon packet from the control device 110, has been described. In the present embodiment, a case where each of the communication terminals 120-1 to 120-3 fails to receive the first beacon packet from the control device 110, will be described.

Figure 11:
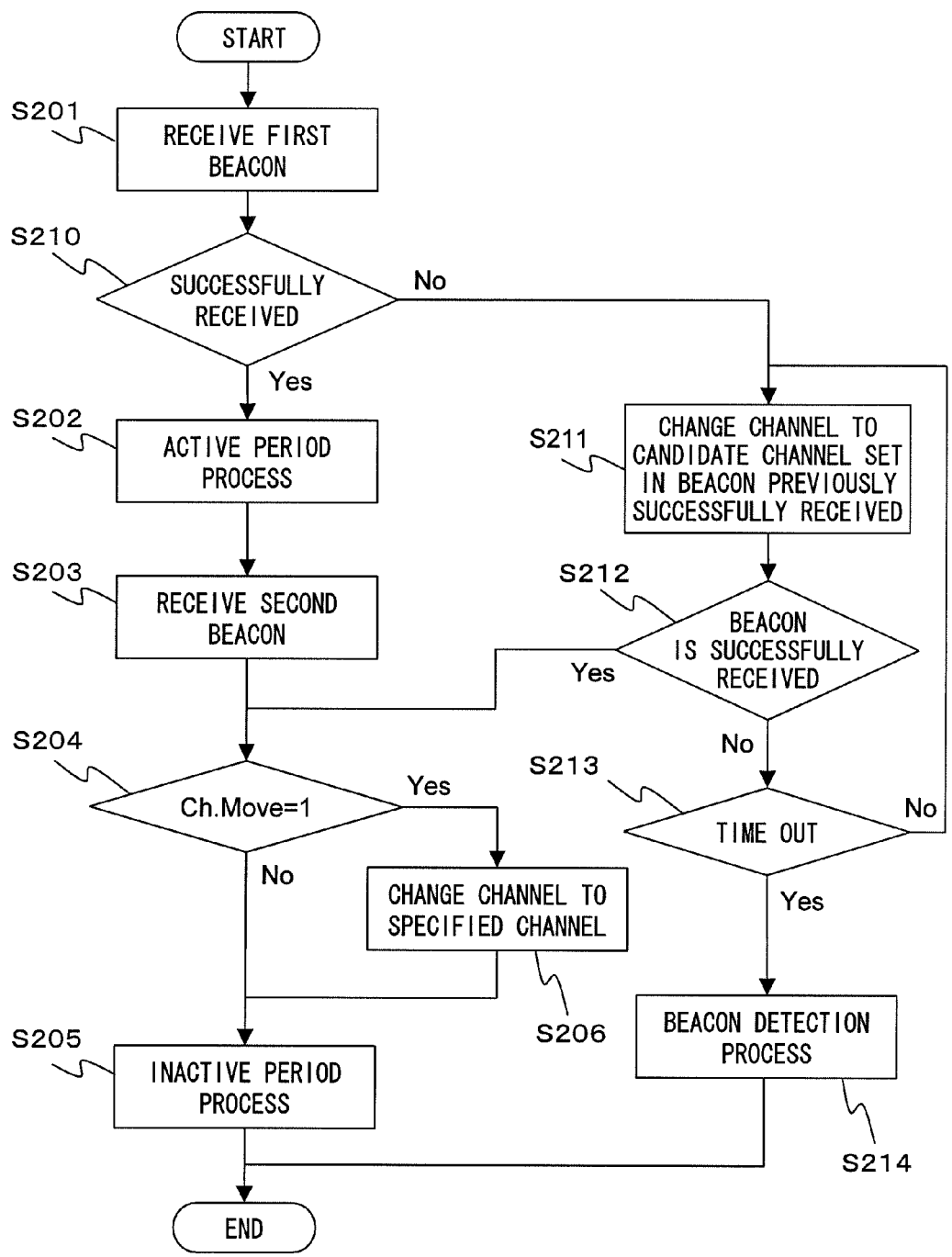
FIG. 11 shows a control flow of each of the communication terminals 120-1 to 120-3 according to a second embodiment of the present invention.

FIG. 11 shows a control flow of each of communication terminals 120-1 to 120-3 according to the second embodiment of the present invention. Here, a control flow of the first communication terminal 120-1 will be described. In FIG. 11, the process in steps S201 to S206 is the same as that in the first communication terminal 120-1 according to the first embodiment of the present invention shown in FIG. 10, and therefore a description thereof is omitted.

In step S210, the first communication terminal 120-1 determines whether or not the first beacon packet is received without an error. When the reception is successful (Yes in step S210), a subsequent process is the same as the process in the first communication terminal 120-1 according to the first embodiment of the present invention shown in FIG. 10. On the other hand, when the reception fails (No in step S210), the process advances to step S211.

In step S211, based on a beacon packet previously successfully received, the first communication terminal 120-1 changes the use channel to a candidate channel set in the beacon packet. Here, the beacon packet previously successfully received may be either the first beacon packet or the second beacon packet. When a plurality of candidate channels are set in the beacon packet previously successfully received, one of them may be arbitrarily selected. When the plurality of candidate channels are prioritized, the highest-priority channel may be selected.

In step S212, the first communication terminal 120-1 determines whether or not a next beacon packet from the control device 110 is received without an error by using the channel to which the use channel has been changed in step S211. When the reception is successful (Yes in step S212), the process goes to step S204, and a subsequent process is the same as the process in the first communication terminal 120-1 according to the first embodiment of the present invention shown in FIG. 10. On the other hand, when the reception fails (No in step S212), the process advances to step S213.

In this manner, the first communication terminal 120-1 repeats the process in steps S211 and S212 for a predetermined time period or over a predetermined number of times (No in step S213). That is, based on a beacon packet previously successfully received, the first communication terminal 120-1 changes the use channel to a candidate channel set in the beacon packet, and repeats the process in steps S211 and S212 until the first communication terminal 120-1 can receive a next beacon packet from the control device 110, by using the channel to which the use channel has been changed. Here, when a plurality of candidate channels are set in the beacon packet previously successfully received, the use channel may be changed sequentially.

In step S213, when the next beacon packet from the control device 110 cannot be received even though the process in steps S211 and S212 is repeated for the predetermined time period or over the predetermined number of times (Yes in step S213), the first communication terminal 120-1 advances the process to step S214.

In step S214, the first communication terminal 120-1 performs a process for detecting a beacon packet from all channels and resynchronizing the beacon packet.

As described above, in the wireless communication system 100 according to the second embodiment of the present invention, the control device 110: broadcasts the first beacon packet 541 to the first to third communication terminals 120-1 to 120-3, in the first time slot of the active period; generates the second beacon packet 542 based on the communication state in the active period; and broadcasts the second beacon packet 542 in the last time slot of the active period. Even when each of the communication terminals 120-1 to 120-3 fails to receive the first beacon packet 541 from the control device 110, a candidate channel is set in the first beacon packet 541 or the second beacon packet 542 previously successfully received, and therefore each of the communication terminals 120-1 to 120-3 can change the use channel to the candidate channel.

When the number of candidate channels notified in the beacon packet which has been previously successfully received is one, the use channel may be changed to the channel and whether or not communication is performed may be scanned. Even when a plurality of candidate channels are included, one of them may be arbitrarily selected, or the channels may be scanned sequentially. As compared with when a candidate channel is not notified, each of the communication terminals 120-1 to 120-3 can search for a channel used by the control device 110 with a smaller number of channels being scanned and for a shorter time.

Third Embodiment

In the second embodiment of the present invention, the case where each of the communication terminals 120-1 to 120-3 fails to receive the first beacon packet from the control device 110, has been described. In the present embodiment, a case where each of the communication terminals 120-1 to 120-3 fails to receive the second beacon packet from the control device 110, will be described.

Figure 12:
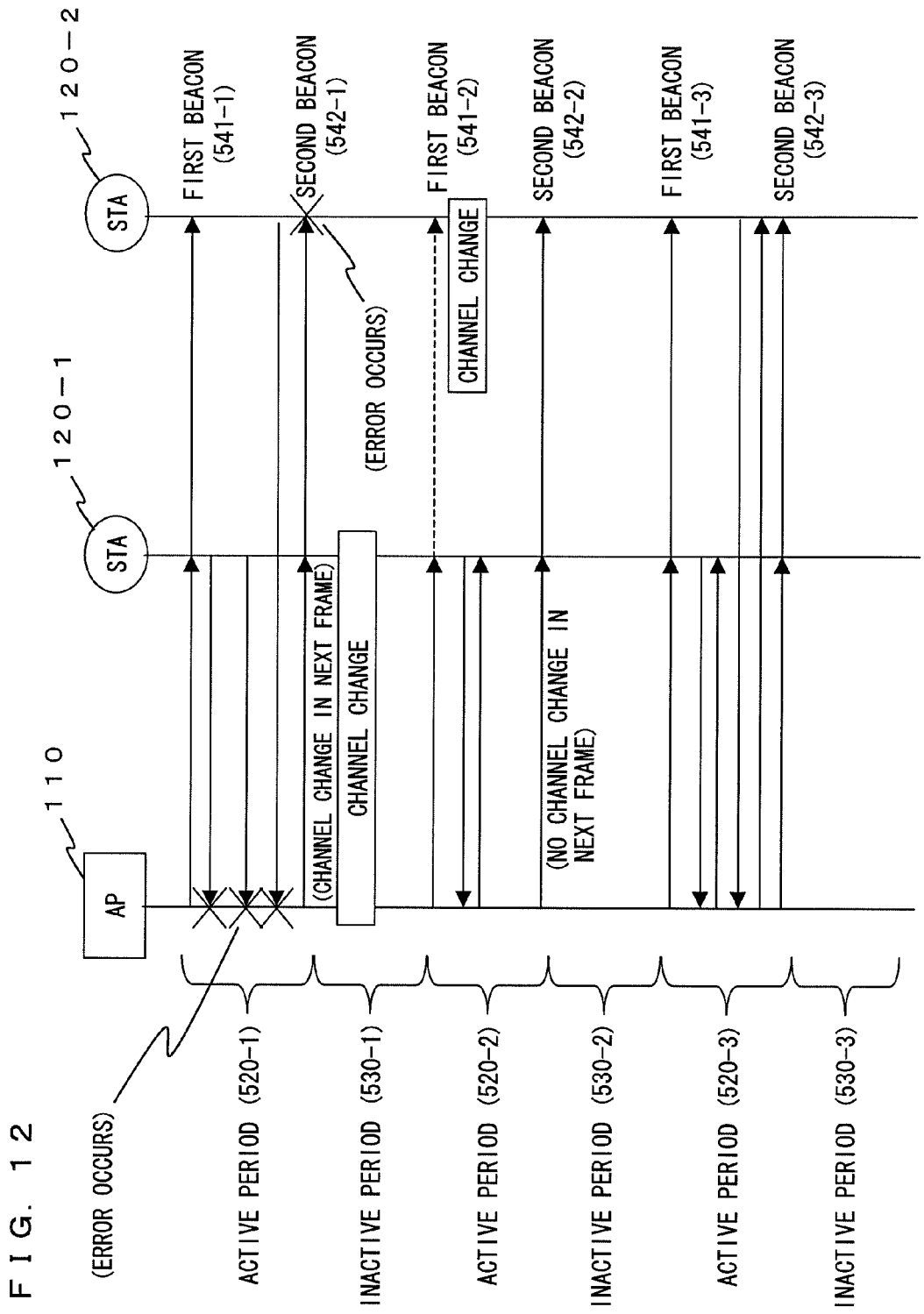
FIG. 12 shows a communication sequence between the control device 110 and each of the communication terminals 120-1 to 120-3 in the wireless communication system 100, in a case where a reception of the second beacon packet fails.

FIG. 12 shows a communication sequence between the control device 110 and each of the communication terminals 120-1 to 120-3 in the wireless communication system 100, in a case where a reception of the second beacon packet fails. The communication sequence shown in FIG. 12 is basically the same as the communication sequence according to the first embodiment of the present invention shown in FIG. 8, and therefore a detailed description is omitted. In the present embodiment, points where the communication sequence according to the present embodiment is different from the communication sequence according to the first embodiment shown in FIG. 8 will be described.

In FIG. 12, in the active period 520-1, the control device 110 and each of the communication terminals 120-1 and 120-2 communicate with each other, but communication errors occur. In the last time slot of the active period 520-1, the control device 110 broadcasts the second beacon packet 542-1 to each of the communication terminals 120-1 and 120-2.

Here, the first communication terminal 120-1 successfully receives the second beacon packet 542-1. After the active period 520-1 ends, in the inactive period 530-1, the first communication terminal 120-1 performs the channel change process for changing the use channel to a channel notified in the second beacon packet 542-1, and then enters the sleep mode. In the active period 520-2, the first communication terminal 120-1 performs communication using the channel to which the use channel has been changed. Accordingly, in the active period 520-2, influence of interference from another network system can be avoided, and the communication from the first communication terminal 120-1 to the control device 110 is successfully performed.

On the other hand, the second communication terminal 120-2 fails to receive the second beacon packet 542-1. After the active period 520-1 ends, in the inactive period 530-1, the second communication terminal 120-2 does not perform the channel change process and enters the sleep mode, because the second communication terminal 120-2 has not acquired information of whether or not the use channel is to be changed, which should have been notified in the second beacon packet 542-1. However, since communication errors occurred between the control device 110 and the second communication terminal 120-2, the control device 110 has performed the channel change process for changing the use channel. Then, in the active period 520-2, the second communication terminal 120-2 tries to communicate using the channel which has not been changed, and the control device 110 transmits the first beacon packet 541-2 using the channel to which the use channel has been changed.

This brings the second communication terminal 120-2 into a state of inability to receive the first beacon packet 541-2. Therefore, the second communication terminal 120-2 executes the process on or after No in step S210 of FIG. 11, which has been described in the second embodiment of the present invention.

In the present embodiment, when the second communication terminal 120-2 fails to receive the second beacon packet 542-1, the second communication terminal 120-2 enters the sleep mode without performing the channel change process in the inactive period 530-1 after the active period 520-1 ends. However, when the second communication terminal 120-2 fails to receive the second beacon packet 542-1, the second communication terminal 120-2 may, based on a beacon packet previously successfully received, change the use channel to a candidate channel set in the beacon packet.

As described above, in the wireless communication system 100 according to the third embodiment of the present invention, the control device 110: broadcasts the first beacon packet 541 to the first to third communication terminals 120-1 to 120-3, in the first time slot of the active period; generates the second beacon packet 542 based on the communication state in the active period; and broadcasts the second beacon packet 542 in the last time slot of the active period. Even when each of the communication terminals 120-1 to 120-3 fails to receive the second beacon packet 542 from the control device 110, a candidate channel is set in the first beacon packet 541 or the second beacon packet 542 previously successfully received, and therefore each of the communication terminals 120-1 to 120-3 can change the use channel to the candidate channel.

When the number of candidate channels notified in the beacon packet which has been previously successfully received is one, the use channel may be changed to the channel and whether or not communication is performed may be scanned. Even when a plurality of candidate channels are included, one of them may be arbitrarily selected, or the channels may be scanned sequentially. As compared with when a candidate channel is not notified, each of the communication terminals 120-1 to 120-3 can search for a channel used by the control device 110 with a smaller number of channels being scanned and for a shorter time.

It is noted that each configuration according to the first to third embodiments described above may be realized as an LSI (Large Scale Integration) which is an integrated circuit. These configurations may be formed into one chip, or a part or the whole of the configurations may be included in one chip. Although the LSI is mentioned herein, it may also be called an IC (Integrated Circuit), a system LSI, a super LSI, or an ultra LSI, depending on the difference in the degree of integration. Furthermore, the method for circuit-integration is not limited to the LSI, and may be realized through circuit-integration of a dedicated circuit or a general-purpose processor. Furthermore, an FPGA (Field Programmable Gate Array) that is capable of programming after manufacturing the LSI or a reconfigurable processor that is capable of reconstituting connections and configurations of a circuit cell within the LSI, may be used. Alternatively, arithmetic processing of these function blocks may be performed by using, for example, a DSP, a CPU (Central Processing Unit), and the like. Furthermore, these processing steps may be recorded as a program on a recording medium, and may be executed.

Additionally, if a technology for circuit-integration which replaces the LSI is introduced as a result of the advance in semiconductor technology or another technology derived therefrom, obviously, such technology may be used for integrating the functional block. One such possibility is an application of biotechnology.

INDUSTRIAL APPLICABILITY

The control device and the communication terminal of the present invention are useful for, for example, a wireless communication system that is used for a sensor network or a wireless communication network using an active RF (Radio Frequency) tag.

REFERENCE SIGNS LIST 10, 100 wireless communication system
11, 110 control device (AP)
12-1 to 12-3, 120-1 to 120-3 communication terminal (STA)
15, 150 communication area
1101, 1104 beacon packet generation section
1102, 1105 beacon packet transmission section
1103, 1202 data communication section
1106, 1204 channel change processing section
1201, 1203 beacon packet reception section
121 control section
122 memory
123 modulation section
124 demodulation section
125 radio frequency section
126 antenna
131 encoding section
132 digital modulation section
133 decoding section
134 digital demodulation section
135 digital-analog conversion section (DAC)
136, 143 low pass filter (LPF)
137, 142 mixer
138, 141 band pass filter (BPF)
139 power amplifier (PA)
140 low noise amplifier (LNA)
144 variable gain amplifier (VGA)
145 analog-digital conversion section (ADC)
146 local oscillator
400 communication packet
401 preamble
402 PHY header
403 MAC header
404 payload
50, 500 frame format
51, 51-1 to 51-3, 510, 510-1 to 510-3 frame
52, 52-1 to 52-3, 520, 520-1 to 520-3 active period
53, 53-1 to 53-3, 530, 530-1 to 530-3 inactive period
54, 54-1 to 54-3, 541, 541-1 to 541-3, 542, 542-1 to 542-3 beacon packet
91 to 96 channel band
S101 to S110 steps performed by control device 110
S201 to S206, S210 to S214 steps performed by communication terminals 120-1 to 120-3

The invention claimed is:

1. A control device which manages a communication terminal within a communication area and communicates with the communication terminal in an active period by using a plurality of predetermined frequency channels, the control device comprising:
a first beacon packet generation section that (i) generates a first beacon packet which includes information indicating the active period and one or more candidate channels to which a currently used channel can be changed, and (ii) outputs the first beacon packet;
a first beacon packet transmission section that (i) receives the first beacon packet inputted from the first beacon packet generating section, and (ii) transmits the first beacon packet to the communication terminal, at the beginning of the active period;
a second beacon packet generation section that (i) determines whether or not a use channel is to be changed, based on a state of communication with the communication terminal in the active period indicated by the transmitted first beacon packet, (ii) generates a second beacon packet which includes information of whether or not the use channel is to be changed, and (iii) outputs the second beacon packet;
a second beacon packet transmission section that (i) receives the second beacon packet inputted from the second beacon packet generating section, and (ii) transmits the second beacon packet to the communication terminal, at the end of the active period; and
a channel change processing section that (i) receives a signal inputted from the second beacon packet transmission section, (ii) changes, when the second beacon packet generation section determines that the use channel is to be changed, the use channel to a channel different from the currently used channel, after the active period ends and before a next active period starts; and (iii) maintains, when the second beacon packet generation section determines that the use channel is not to be changed, the currently used channel as the use channel.

2. The control device according to claim 1,
wherein, when the second beacon packet generation section determines that the use channel is to be changed, the second beacon packet includes a channel determined as a channel to which the use channel is to be changed, and
wherein, when the second beacon packet generation section determines that the use channel is not to be changed, the second beacon packet includes one or more candidate channels to which a currently used channel can be changed.

3. The control device according to claim 1, wherein, when the second beacon packet generation section determines that the use channel is to be changed, the channel change processing section changes the use channel to any of the one or more candidate channels included in the first beacon packet after the active period ends and before a next active period starts.

4. The control device according to claim 1, wherein, when the second beacon packet generation section determines that the use channel is to be changed, the channel change processing section changes the use channel to a channel different from the one or more candidate channels included in the first beacon packet after the active period ends and before a next active period starts.

5. The control device according to claim 1, wherein the first beacon packet includes a plurality of candidate channels of which a priority order is defined.

6. The control device according to claim 1, wherein, when the number of communication errors occurring in communication with the communication terminal in the active period exceeds a predetermined threshold value, it is determined that the use channel is to be changed.

7. A communication terminal which is managed by a control device of a communication area to which the communication terminal belongs, and communicates with the control device in an active period by using any of a plurality of predetermined frequency channels, the communication terminal comprising:
a first beacon packet reception section that receives, from the control device, a first beacon packet which includes information indicating the active period and one or more candidate channels to which a currently used channel can be changed, at the beginning of the active period;
a second beacon packet reception section that receives, from the control device, a second beacon packet which includes information of whether or not a use channel is to be changed, at the end of the active period; and
a channel change processing section that (i) receives a signal inputted from the second beacon packet reception section, and (ii) based on the information of whether or not the use channel is to be changed which is included in the second beacon packet, when the use channel is to be changed, changes the use channel to a channel different from the currently used channel after the active period ends and before a next active period starts, and, when the use channel is not to be changed, maintains the currently used channel as the use channel.

8. The communication terminal according to claim 7,
wherein when the use channel is to be changed, the second beacon packet includes at channel determined as a channel to which the use channel is to be changed, and
wherein, when the use channel is not to be changed, the second beacon packet includes one or more candidate channels to which a currently used channel can be changed.

9. The communication terminal according to claim 7, wherein, when the use channel is to be changed based on the information of whether or not the use channel is to be changed which is included in the second beacon packet, the channel change processing section changes the use channel to any of the one or more candidate channels included in the first beacon packet after the active period ends and before a next active period starts.

10. The communication terminal according to claim 7, wherein, when the use channel is to be changed based on the information of whether or not the use channel is to be changed which is included in the second beacon packet, the channel change processing section changes the use channel to a channel different from the one or more candidate channels included in the first beacon packet after the active period ends and before a next active period starts.

11. The communication terminal according to claim 7, wherein the first beacon packet includes a plurality of candidate channels of which a priority order is defined.

12. The communication terminal according to claim 7, wherein, when the first beacon packet reception section fails to receive the first beacon packet, the channel change processing section changes the use channel to a channel different from the currently used channel.

13. The communication terminal according to claim 12, wherein, when the first beacon packet reception section fails to receive the first beacon packet, the channel change processing section changes the use channel to any of the one or more candidate channels included in the first beacon packet or the second beacon packet which has been previously successfully received.

14. The communication terminal according to claim 7, wherein, when the second beacon packet reception section fails to receive the second beacon packet, the channel change processing section changes the use channel to a channel different from the currently used channel.

15. The communication terminal according to claim 14, wherein, when the second beacon packet reception section fails to receive the second beacon packet, the channel change processing section changes the use channel to any of the one or more candidate channels included in the first beacon packet or the second beacon packet which has been previously successfully received.

16. A wireless communication system in which a communication terminal within a communication area and a control device which manages the communication terminal communicate with each other in an active period by using any of a plurality of predetermined frequency channels,
the control device comprising:
a first beacon packet generation section that (i) generates a first beacon packet which includes information indicating the active period and one or more candidate channels to which a currently used channel can be changed, and (ii) outputs the first beacon packet;
a first beacon packet transmission section that (i) receives the first beacon packet inputted from the first beacon packet generation section, and (ii) transmits the first beacon packet to the communication terminal, at the beginning of the active period;

a second beacon packet generation section that (i) determines whether or not a use channel is to be changed, based on a state of communication with the communication terminal in the active period indicated by the transmitted first beacon packet, (ii) generates a second beacon packet which includes information of whether or not the use channel is to be changed, and (iii) outputs the second beacon packet;

a second beacon packet transmission section that (i) receives the second beacon packet inputted from the second beacon packet generating section, and (ii) transmits the second beacon packet to the communication terminal, at the end of the active period; and a control device channel change processing section that (i) receives a signal inputted from the second beacon packet transmission section, (ii) changes, when the second beacon packet generation section determines that the use channel is to be changed, the use channel to a channel different from the currently used channel, after the active period ends and before a next active period starts and (iii) maintains, when the second beacon packet generation section determines that the use channel is not to be changed, the currently used channel as the use channel, the communication terminal comprising:

a first beacon packet reception section that receives the first beacon packet from the control device at the beginning of the active period;

a second beacon packet reception section that receives the second beacon packet from the control device at the end of the active period; and a communication terminal channel change processing section that (i) receives a signal inputted from the second beacon packet reception section, and (ii) based on the information of whether or not the use channel is to be changed which is included in the second beacon packet, when the use channel is to be changed, changes the use channel to the change channel different from the currently used channel after the active period ends and before a next active period starts, and, when the use channel is not to be changed, maintains the currently used channel as the use channel.

17. An integrated circuit used for a communication terminal which is managed by a control device of a communication area to which the communication terminal belongs, and communicates with the control device in an active period by using any of a plurality of predetermined frequency channels, the integrated circuit comprising:

a first beacon packet reception section that receives, from the control device, a first beacon packet which includes information indicating the active period and one or more candidate channels to which a currently used channel can be changed, at the beginning of the active period;

a second beacon packet reception section that receives, from the control device, a second beacon packet which includes information of whether or not a use channel is to be changed, at the end of the active period; and a channel change processing section that (i) receives a signal inputted from the second beacon packet reception section, and (ii) based on the information of whether or not the use channel is to be changed which is included in the second beacon packet, when the use channel is to be changed, changes the use channel to a channel different from the currently used channel after the active period ends and before a next active period starts, and, when the use channel is not to be changed, maintains the currently used channel as the use channel.

18. A control method performed by a control device which manages a communication terminal within a communication area and communicates with the communication terminal in an active period by using a plurality of predetermined frequency channels, the control method comprising:

a first beacon packet generation step of generating a first beacon packet which includes information indicating the active period and one or more candidate channels to which a currently used channel can be changed;

a first beacon packet transmission step of transmitting the first beacon packet to the communication terminal at the beginning of the active period;

a second beacon packet generation step of (i) determining whether or not a use channel is to be changed, based on a state of communication with the communication terminal in the active period indicated by the transmitted first beacon packet, and (ii) generating a second beacon packet which includes information of whether or not the use channel is to be changed;

a second beacon packet transmission step of transmitting the second beacon packet to the communication terminal at the end of the active period; and a channel change processing step of (i) when it is determined in the second beacon packet generation step that the use channel is to be changed, changing the use channel to a channel different from the currently used channel, after the active period ends and before a next active period starts, and (ii) when it is determined in the second beacon packet generation step that the use channel is not to be changed, maintaining the currently used channel as the use channel.

19. A communication method performed by a communication terminal which is managed by a control device of a communication area to which the communication terminal belongs, and communicates with the control device in an active period by using any of a plurality of predetermined frequency channels, the communication method comprising:

a first beacon packet reception step of receiving, from the control device, a first beacon packet which includes information indicating the active period and one or more candidate channels to which a currently used channel can be changed, at the beginning of the active period;

a second beacon packet reception step of receiving, from the control device, a second beacon packet which includes information of whether or not a use channel is to be changed, at the end of the active period; and a channel change processing step of, based on the information of whether or not the use channel is to be changed which is included in the second beacon packet, when the use channel is to be changed, changes the use channel to a channel different from the currently used channel after the active period ends and before a next active period starts, and, when the use channel is not to be changed, maintains the currently used channel as the use channel.

* * * * *